United States Patent [19]
Nishikawa et al.

[11] Patent Number: 6,063,527
[45] Date of Patent: May 16, 2000

[54] COLOR FILTER AND METHOD OF MAKING THE SAME

[75] Inventors: Takao Nishikawa; Hiroshi Kiguchi; Atsushi Takakuwa; Masaru Kojima, all of Nagano-ken, Japan

[73] Assignee: Seiko Epson Corporation, Tokyo, Japan

[21] Appl. No.: 09/091,986

[22] PCT Filed: Oct. 28, 1997

[86] PCT No.: PCT/JP97/03909

§ 371 Date: Jun. 30, 1998

§ 102(e) Date: Jun. 30, 1998

[87] PCT Pub. No.: WO98/19188

PCT Pub. Date: May 7, 1998

[30] Foreign Application Priority Data

Oct. 30, 1996 [JP] Japan .................................. 8/288774
Feb. 7, 1997 [JP] Japan .................................. 9/025678

[51] Int. Cl.$^7$ ............................ G02B 5/20; G02F 1/1335
[52] U.S. Cl. ................................................ 430/7; 427/164
[58] Field of Search ............................ 430/7; 347/106; 427/164

[56] References Cited

U.S. PATENT DOCUMENTS

| 4,430,666 | 2/1984 | Nakatsui et al. ........................ 358/44 |
| 5,157,527 | 10/1992 | De Keyzer et al. ..................... 359/66 |
| 5,201,268 | 4/1993 | Yamamoto et al. ................... 101/170 |

FOREIGN PATENT DOCUMENTS

| 0 299 508 A1 | 1/1989 | European Pat. Off. . |
| 59-75205 | 4/1984 | Japan . |
| 61-245106 | 10/1986 | Japan . |
| 2-157706 | 6/1990 | Japan . |
| 4-214531 | 8/1992 | Japan . |
| 4-249401 | 9/1992 | Japan . |
| 5-66305 | 3/1993 | Japan . |
| 6-027314 | 2/1994 | Japan . |
| 6-167608 | 6/1994 | Japan . |
| 7-64074 | 3/1995 | Japan . |
| 7-146406 | 6/1995 | Japan . |
| 7-301707 | 11/1995 | Japan . |
| 8-160219 | 6/1996 | Japan . |
| 8-166507 | 6/1996 | Japan . |
| 8-248220 | 9/1996 | Japan . |
| 9-61617 | 3/1997 | Japan . |

OTHER PUBLICATIONS

English Language Translation of JP 6–167608, "Method for Manufacturing Color Filter", Sawazaki et al. (Jun. 1994).

Primary Examiner—John A. McPherson
Attorney, Agent, or Firm—Oliff & Berridge, PLC

[57] ABSTRACT

The object is to make a color filter smoothly. It includes a step of causing a discharge in a gas atmosphere including oxygen at atmospheric pressure and treating a substrate (10) by means of the activated species; and a step of injecting ink of predetermined color in ink filling concavities (29) in a predetermined layout formed on a template (13) to form a color pattern layer (14), next adhering the substrate (10) to the template (13) having the color pattern layer (14) formed thereon with a resin layer (15) interposed therebetween, and then separating the color pattern layer (14), resin layer (15), and substrate (10) as one from the template (13).

38 Claims, 24 Drawing Sheets

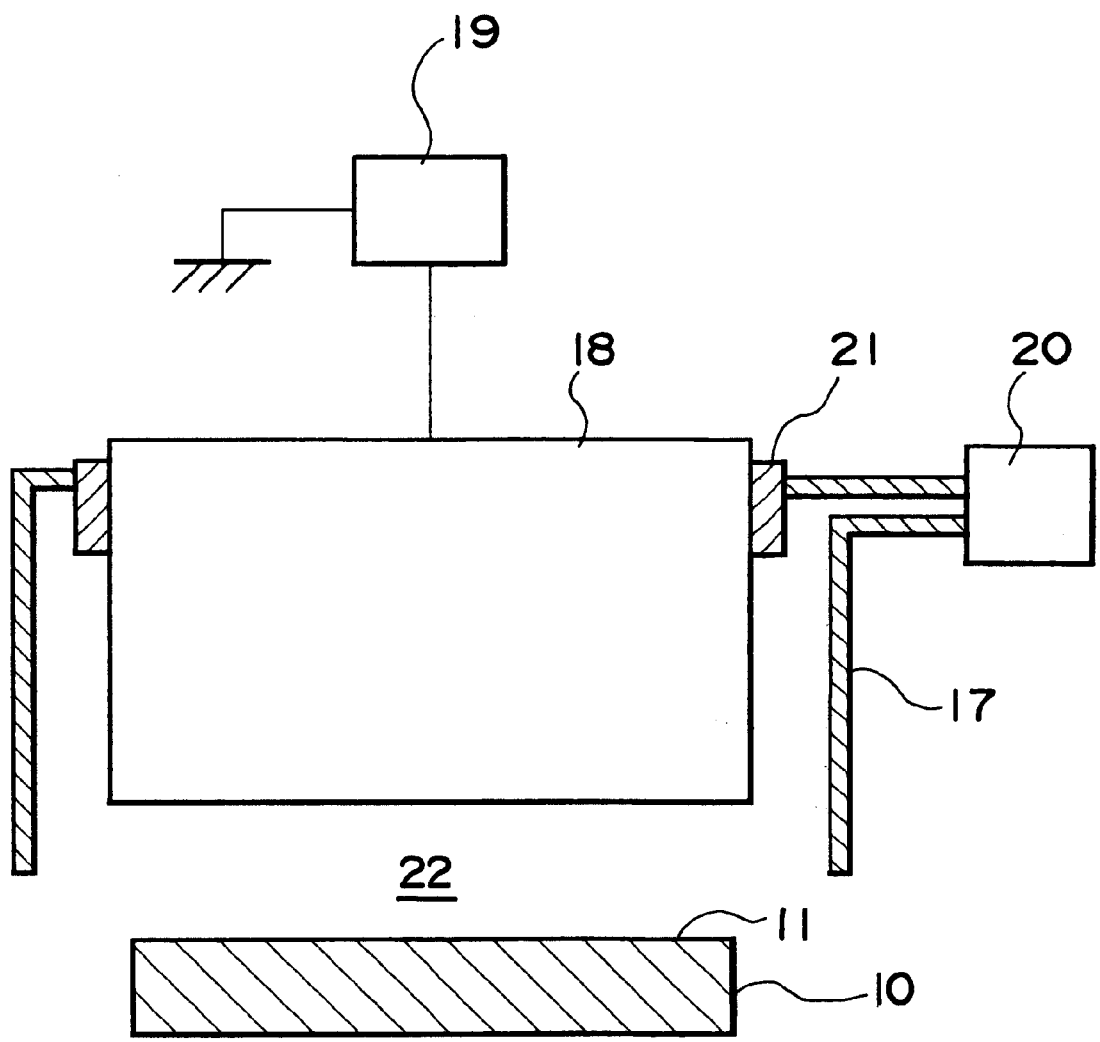

FIG.13
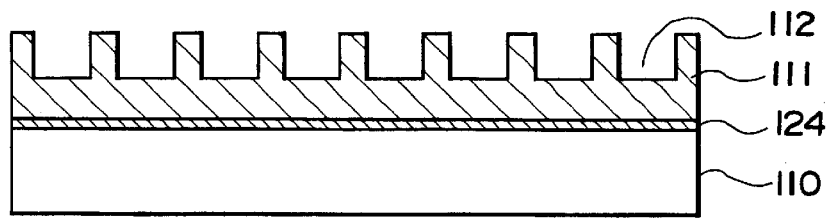
FIG.14A
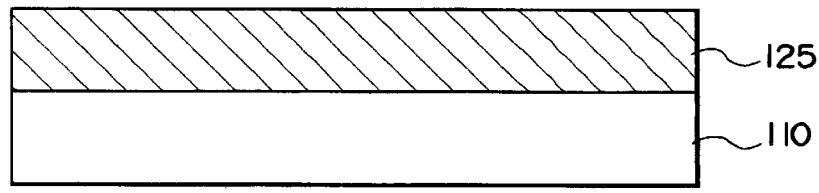
FIG.14B
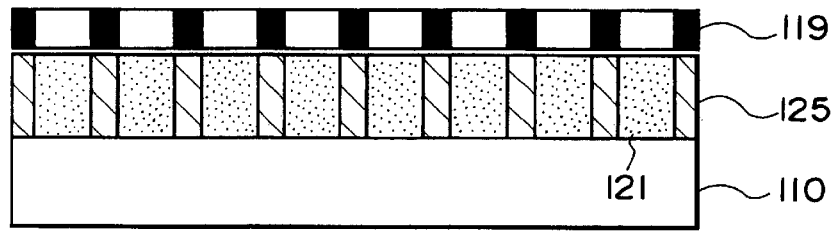
FIG.14C
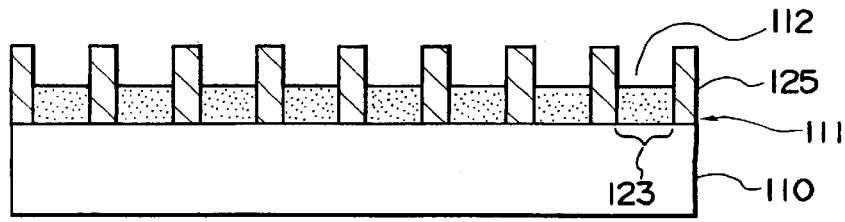

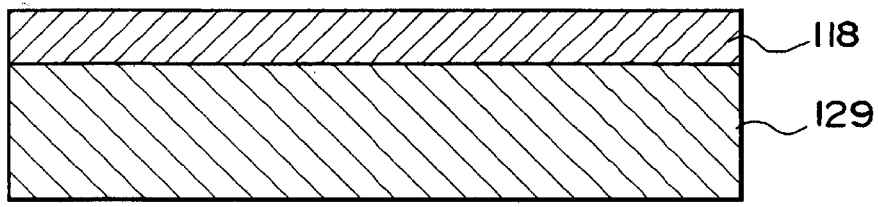
FIG. 16A
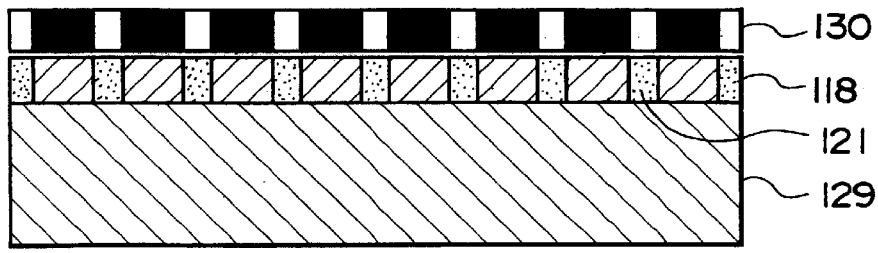
FIG. 16B
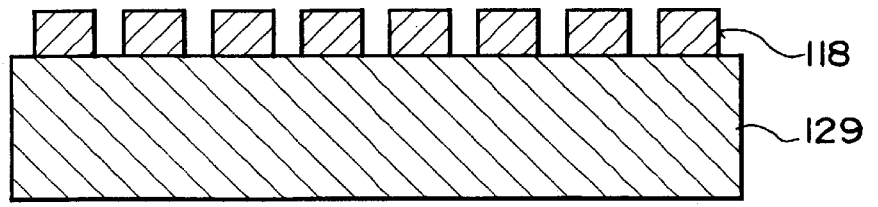
FIG. 16C
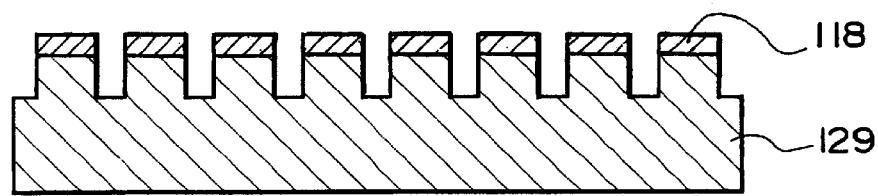
FIG. 16D
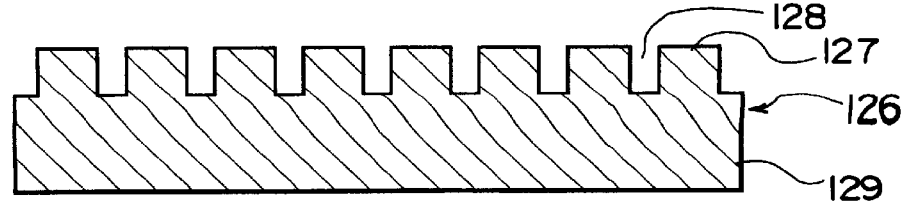
FIG. 16E

COLOR FILTER AND METHOD OF MAKING THE SAME

TECHNICAL FIELD

The invention relates to a color filter for use in a liquid crystal display panel or the like, and a method of making the same.

BACKGROUND ART

Methods of making a color filter for a liquid crystal display panel or the like include dyeing method, pigment dispersion method, printing method, and electrodeposition method.

In the dyeing method, a photosensitive material is added to the water-soluble polymer material which is the dye material, sensitizing it to light, and after this has been patterned by a lithographic process, it is steeped in a dye solution, to obtain the colored pattern.

For example, first an opaque portion (generally black and referred to as a "black matrix", hereinafter abbreviated to BM) is formed on a glass substrate. Then the dye material, which is made by adding photosensitive material to water-soluble polymer material so that when exposed to light the solubility in a solvent is reduced, is coated on the substrate on which the BM is formed. Next a part only of the dye material is exposed to light through a mask and then developed, thus carrying out patterning so that the dye material remains only in the areas of the first color. Next the dye material is steeped in dye solution to be dyed and then set to form the first color layer. This process is repeated three times, to form a three-color filter.

Whereas a color filter made by the dyeing method has a high transmissivity and bright colors, it is characterized by inferiority with respect to light-resistance, heat-resistance and hygroscopicity.

Next, in the pigment dispersion method, a photosensitive resin in which pigment has been dispersed is coated on a substrate, and this is patterned to obtain a single-color pattern; this process is then repeated. In the above dyeing method, the dyeing is carried out after patterning the dye material, whereas with the pigment dispersion method a photosensitive resin which has already been colored is coated on the substrate. A color filter made by the pigment dispersion method is characterized by high durability, but is somewhat reduced transmissivity.

Furthermore, of the layer of photosensitive resin, at least more than 70% of the amount applied must be removed and disposed of, producing a big problem in the efficiency of use of the material. in the printing method, paint made by dispersing pigment in thermosetting resin is applied by repeated printing to form three colors respectively, and the resin is heat-cured to form the color layer. While the printing method is simple, it is inferior in flatness.

In the electrodeposition method, a patterned transparent electrode is provided on a substrate, and then this is immersed in an electrodeposition fluid containing pigment, resin, electrolyte and so forth, for electrodeposition of the first color. This process is repeated three times, and then finally baking is applied. The electrodeposition method provides excellent flatness, and is effective for color arrangement in a striped pattern, but is difficult to form a color arrangement in a mosaic pattern.

Of the above methods of fabrication, the printing method has a drawback with respect to accuracy, and the electrodeposition method has a drawback of restrictions of patterning, and for this reason conventionally the dyeing method and pigment dispersion method have been most widely used.

However, the dyeing method and the pigment dispersion method require a lithography step for forming the pixel regions of each of the first color, second color and third color, and this is a big obstacle to improve the mass production efficiency of the color filter. One method for forming pixels without a lithography step for each color is an inkjet method of making a color filter, which is disclosed in a number of publications, for example, Japanese Patent Application Laid-Open No. 59-75205 and Japanese Patent Application Laid-Open No. 61-245106. By using an inkjet method to form the pixels, the efficiency of use of material improves, and the process is made shorter, and moreover a color filter of high brightness can be obtained.

One method of thus making a color filter by the inkjet method which has been proposed includes steps of: injecting ink of predetermined colors in a plurality of ink filling. concavities which are formed in a predetermined pattern on a template to form a color pattern layer; then attaching a substrate on the surface of the template on which the color pattern layer is formed with a layer of resin therebetween; thereafter removing the color pattern layer, the resin layer and the substrate as one from the template.

In other words, in this method of making a color filter, the form of the color pattern layer is controlled by the ink filling concavities on the template, and a color filter of high precision can be obtained.

However, in the above described method of making a color filter, there is room for improvement in the following aspects of the step of separating the color pattern layer and resin layer from the template.

Firstly, unless there is good adhesion between the substrate and the resin layer, when the color pattern layer and resin layer are removed as one from the template, the resin layer becomes partially or wholly detached from the substrate, letting the resin layer float above the substrate or break away from the substrate.

Besides, since the adhesion between the color pattern layer and the template is different with each color, separation from the template is not uniform, and transfer faults occurs, such as the color pattern layer breaking away, cracks occurring or deformation.

On the other hand, by making the adhesion between each color pattern layer and the template the same, the detachment from the template can be made uniform, and transfer faults can be avoided, but since the balance with other characteristics required of ink such as the color characteristics and the ejection characteristics of the inkjet method must be considered, the difficulties with the composition and selection of the ink material further increases.

The invention is to solve the above described problems, and its object is to provide a color filter and a method of making the same, such that the process of detachment from the template can be carried out smoothly.

DISCLOSURE OF INVENTION

The method of making a color filter according to the invention comprises: a step of causing a discharge in an atmosphere of gas including at least oxygen at atmospheric pressure or a pressure close thereto, and treating a substrate with activated species created by the discharge; and a step of forming color pattern layers by injecting ink of at least one predetermined color in a plurality of ink filling concavities formed in a predetermined layout on a template, then adhering the substrate to the template having the color pattern layers formed thereon with a resin layer interposed therebetween, and then separating the color pattern layers, the resin layer, and the substrate as one from the template.

In other words, the invention is to treat the surface of the substrate to improve its adhesion to the resin, using activated species, such as excited species and ion created by a discharge, and thus preventing the resin layer from breaking away and the detachment from the substrate. Also, since the invention carries out treatment at atmospheric pressure, compared with the case in which vacuum apparatus of which the running costs are high is used, the substrate can be treated at a low cost, and moreover, since the treatment is dry the controllability is good.

The following can be given as specific examples of methods of forming the ink filling concavities on the template.

(1) Forming method by etching the template.

(2) Forming method by providing pixel partitions on the template.

(3) Forming method on an ink filling layer provided on the template.

As a method of filling these ink filling concavities with ink of predetermined color, an inkjet method is preferred. According to the inkjet method, the practical technology developed for inkjet printers can be employed, enabling the filling operation to be carried out rapidly and economically, with no ink waste.

Besides, in the process of treating the substrate, the following specific examples of steps may be given.

(a) A stop in which a discharge generating electrode is disposed in the vicinity of the substrate, a high frequency voltage is applied to the discharge generating electrode, the discharge is created in a space between the substrate and the discharge generating electrode, and at least oxygen gas is passed through the space creating the excited species, ions and other activated species, whereby the substrate is treated.

By means of this stop, the substrate is treated while directly exposed to the discharge.

(b) A step in which a discharge generating electrode and a counterelectrode are disposed, a high frequency voltage is applied between the discharge generating electrode and the counterelectrode, the discharge is created in a space between the discharge generating electrode and the counterelectrode, at least oxygen gas is passed through the space creating the excited species; ions and other activated species, the substrate is disposed so as not to be exposed to the discharge, and a gas flow including the activated species is expelled from a gas outlet, whereby the substrate is treated.

By means of this step, the substrate can be treated without being directly exposed to the discharge.

The above step (a) has a higher treatment efficacy compared with step (b), but since the substrate tends to become hot, if a substrate of low heat resistance is used, there is a tendency for the substrate to be deformed by the heat.

Besides, according to step (b) above, since the location of the discharge generating portion and the substrate treating portion are separated, there are fewer restraints in the design of the machine, and since the substrate is less likely to become hot, treatment of a substrate with low heat resistance is easy.

Besides, it is preferable that the discharge generating electrode in step (a) above, or the gas outlet in stop (b) above is no less than the treatment area of the substrate to be treated. By this, since the substrate can be treated in a single operation, the treatment time can be shortened, and the substrate can be treated while fixed to lighten the load on the machine.

Preferably, the substrate is subjected to treatment while in the heated state. The invention employs a chemical reaction for treatment, and this reaction is promoted by heat, for which reason by carrying out the treatment with the substrate heated, the treatment time can be reduced.

On the other hand, when using a substrate with low heat resistance, it is preferable that the substrate is subjected to treatment while in the cooled state. Cooling the substrate limits the deformation of the substrate due to heat.

The method of making a color filter of the invention is characterized by comprising: a first stop of forming an ink filling layer having a plurality of ink filling concavities in a predetermined layout on a first template; a second step of forming color pattern layers by injecting ink of at least one predetermined color in each of the ink filling concavities; a third step of forming a resin layer having optical transmissivity by painting resin over the ink filling layer where the color pattern layers are formed; and a fourth step of separating the resin layer together with the color pattern layers and the ink filling layer as one from the first template, after the resin layer is set.

In other words, the invention is a method of making a color filter in which the form ,of a color pattern layers are controlled by ink filling concavities in an ink filling layer formed beforehand on a template. The color pattern layer formed by this method has excellent flatness, and sharp edges. As a result, a color filter can be obtained with no color unevenness, and high precision.

According to the method of making a color filter according to the invention, since only the ink filling layer comes into contact with the template, each color pattern layer does not come into contact with the template. Moreover, in the fourth step, since the color pattern layers are separated from the template while protected by the ink filling layer, the stress applied to the color pattern layers during the separation process can be reduced. As a result, transfer faults including breaking off the color pattern layer, generation of cracks, and deformation can be prevented. Besides, since each color pattern layer does not contact the template, limitations on the releasing characteristics of the ink materials from the template are eliminated, increasing the flexibility with which the ink materials can be designed and it selected.

In the color filter obtained by the method of making a color filter of the invention, the ink filling layer doubles as an over-coating layer (protective layer) for the color pattern layers, and therefore a step of forming an over-coating layer is not required. Moreover, by using a smooth template, a color filter with excellent smoothness can be obtained without smoothing treatment.

In the second step, it is preferable that the ink is to injected using an inkjet method.

According to the inkjet method, the practical technology developed for inkjet printers can be employed, enabling the filling operation to be carried out rapidly and with an ink use rate of close to 100%, so that there is no ink waste.

In the second step it is preferable that the ink with which the ink filling concavities have been filled is subjected to heat treatment, and the solvent ingredient is volatilized, to form the color pattern layers. After the solvent ingredient has been volatilized in this way, the resin layer is formed in the third step described above, and the color pattern layers are made set, whereby transfer faults and mixture with the resin layer can be prevented. This is also effective in preventing a reduction in reliability of the color filter due to residual solvent.

It is preferable that in the first step, in at least the region of the surface of the first template on which the ink filling layer is formed, a release agent is applied beforehand, or a release agent is added beforehand to the material of which the ink filling layer is formed, whereby it is made easier to separate the ink filling layer from the template. By this means, the separation from the template can be carried out satisfactorily.

Alternatively, in at least the region of the surface of the template in which the ink filling layer is formed, a releasing layer of a material for improving the releasability of the ink filling layer, that is to say, a material of low adhesion to the ink filling layer may be formed, and the same effect obtained.

Besides, if the third stop includes a step of mounting a reinforcing plate having optical transmissivity on the resin layer, the mechanical strength of the color filter can improve.

Besides, in the first step, a substance of liquid for forming the ink filling layer which can be set by applying energy may be provided on a second template having a relief pattern consisting of convex portions corresponding to the ink filling concavities and concave portions formed around the convex portions; the first template may be put into the substance; the substance after set may be separated together with the first template as one from the second template; and the relief pattern of the second template may be transferred to the substance, whereby the ink filling layer having the ink filling concavities may be formed on the template.

Alternatively, the second template may be formed by etching a resist layer formed on a third template, forming a resist pattern corresponding to the relief pattern of the second template, making the surface of the resist pattern electrically conducting, and electrodepositing a metal by an electroplating method to form a metal layer, removing the metal layer from the third template, and removing the resist.

According to these processes, the second template, once made, can be used as many times as necessary, within the limits of durability, removing the need for a lithography process as described above in each step, and is thus economical.

The relief pattern of the second template may be formed for example by etching. When the second template has a relief pattern corresponding to the ink filling concavities formed by etching, it is preferable that a silicon wafer is used as the substrate. The technology for etching a silicon wafer is used as the technology for making semiconductor devices, and high-precision forming is possible.

It is preferable that in at least the region of the surface of the second template contacted by the ink filling layer, a release agent is applied beforehand, or a release agent is added beforehand to the material of which the ink filling layer is formed, whereby it is made easier to separate the ink filling layer from the template. By this means, the separation from the template can be carried out satisfactorily.

Alternatively, in at least the region of the surface of the second template contacted by said ink filling layer, a releasing layer of a material for improving the releasability of the ink filling layer, that is to say, a material of low adhesion to the ink filling layer may be formed, and the same effect obtained.

Next, when a BM is required on the side of the color filter substrate, in the first step, an opaque ink may be inserted into the concave portions on the second template before the liquid substance is provided on the second template; and on the periphery of the ink filling concavities an opaque layer may be formed from the opaque ink.

Additionally, as the method of filling with the opaque ink is preferably used an inkjet method of filling.

According to the inkjet method, the practical technology developed for inkjet printers can be employed, enabling the filling operation to be carried out rapidly and with an ink use rate of close to 100%, so that there is no ink waste.

Furthermore, it is preferable that the opaque ink with which the ink filling concavities on the second template have been filled is subjected to heat treatment, and the solvent ingredient is volatilized, to form the opaque layer. After the solvent ingredient has been volatilized in this way, the ink filling layer is formed, and the opaque layer is made set, whereby transfer faults during the separation from the second template and mixture of the opaque layer and the ink filling layer can be prevented, and moreover this is also effective in preventing a reduction in reliability of the color filter due to residual solvent.

Moreover, it is preferable that by adding beforehand a release agent to the opaque ink, it is made easier to separate the opaque layer from the second template. By this means, the separation from the second template can be carried out satisfactorily.

Alternatively, the concave portions of the relief pattern of the second template may have an area smaller at the bottom than at the opening. By making this so, the top area of the opaque layer is reduced, and a narrow BM (black matrix) can be obtained.

By the above described method of making a color filter, a color filter with excellent flatness, no unevenness of color density, and high precision can be obtained at low cost. Additionally, a BM of economic nature and high precision can also be built in.

Further, in the first template, a concave portion for forming a spacer may be formed; in the first step, the ink filling layer may be formed by providing a substance for forming the ink filling layer in the liquid state on the first template, and setting this substance to form the ink filling layer; and a spacer convex portion corresponding to the concave portion for forming a spacer may be formed in the ink filling layer.

By making this so, a color filter with an integral spacer can be made easily.

The color filter of the invention comprises an optically transmitting ink filling layer having ink filling concavities, a color pattern layer formed by filling the ink filling concavities with ink of predetermined color, and an optically transmitting resin layer applied over the ink filling layer where the color pattern layer is formed.

This color filter may have a reinforcing plate having optical transmissivity on the resin layer, an opaque layer may be formed around the periphery of the ink filling concavities, and the ink filling layer may have an integrally formed spacer.

Besides, the color filter may have the ink filling concavities formed so as to widen from their bottoms toward their openings, and the opaque layer, on the periphery of the openings, may be formed with its top portion smaller than its base portion.

BRIEF DESCRIPTION OF DRAWINGS

FIG. 2 is a schematic view of a device for treating a substrate in the first embodiment of the invention;

FIG. 13 is a sectional view of a template on which has been formed a releasing layer in the fourth embodiment of the invention;

FIGS. 14A to 14C illustrate the process of formation of an ink filling layer having ink filling concavities on a template in a fifth embodiment of the invention;

FIGS. 16A to 16E illustrate the method of making a second template in the sixth embodiment of the invention;

BEST MODE FOR CARRYING OUT THE INVENTION

The preferred embodiments of the invention is now described with reference to the drawings.
(First Embodiment)

FIGS. 1A to 1D illustrate the process of making a color filter in an embodiment of the invention.

In more detail, this method is as follows.

Figure 1A:
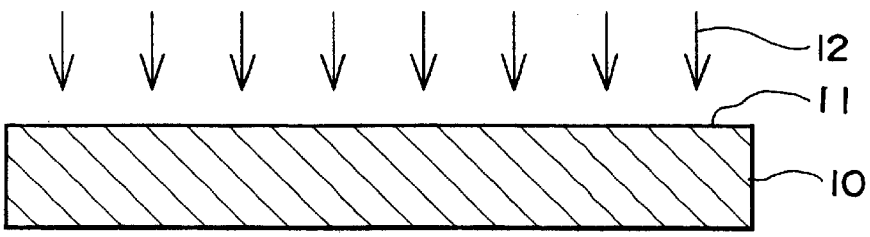
FIGS. 1A to 1D illustrate the process of making a first embodiment of a color filter according to the invention.

First, as shown in FIG. 1A, a substrate 10 is subjected to a discharge in an atmosphere of gas including at least oxygen, at atmospheric pressure or a pressure close thereto, and is treated by activated species 12, such as excited species and ions created by this discharge. The treated surface 11 of the substrate 10 at this point is the surface to which a resin layer 15 created in the step shown in FIG. 1C is adhered.

FIG. 2 is a schematic view of a device for treating the substrate, used in the step of FIG. 1A. This device has a metallic cover 17 connected to ground, within which a discharge generating electrode 18 is electrically insulated by an insulator 21. This treatment is carried out at atmospheric pressure, and the atmosphere is therefore of air.

The substrate 10 is placed within this device so that as shown in FIG. 2, the treated surface 11 is uppermost.

The substrate 10 is selected according to the color filter to be made, and may for example employ a glass plate, or a plate or film of a plastic material such as polycarbonate, polyarylate, polyether sulfone, amorphous polyolefin, polyethylene terephthalate, or polymethyl methacrylate.

Next, oxygen and helium gas are supplied into the metallic cover 17 by a gas supply device 20, and in the vicinity of the discharge generating electrode 18 and substrate 10, the atmosphere is replaced by oxygen and helium gas. The helium gas serves to promote the production of discharge.

Next, high-frequency electric power is applied from a high-frequency power supply 19 to the discharge generating electrode 18, whereupon a discharge occurs between the discharge generating electrode 18 and the substrate 10, forming a discharge portion 22. In the discharge portion 22 the oxygen gas is activated by dissociation, ionization, excitation and so on, to form chemically activated species, and the surface of the substrate 10 is exposed to the discharge portion 22, whereupon the breaking of molecular bonds and oxidation on the surface occur.

As a result, the wettability, to the substrate 10, of the material used for forming the resin layer 15 formed in the step shown in FIG. 1C improves, and thus the adhesion of the substrate 10 to the resin layer 15 improves.

Here helium gas was used as the gas for serving the generation of a discharge, but the same effect can also be obtained from argon gas.

The conditions for causing the discharge do not necessarily require the metallic cover 17 on the machine. It is also not necessary for the metallic cover 17 to be metallic, and ceramic may also be used.

The larger the size of the discharge generating electrode 18, the better, and this is preferably larger than the treated surface 11 of the substrate 10. By this means, the substrate 10 can be treated in a single operation, and therefore the treatment time is reduced, and since the substrate 10 can be treated while fixed, lightening the load on the machine.

Figure 1B:
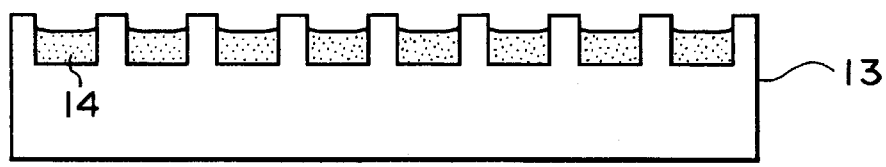
Figure 1C:
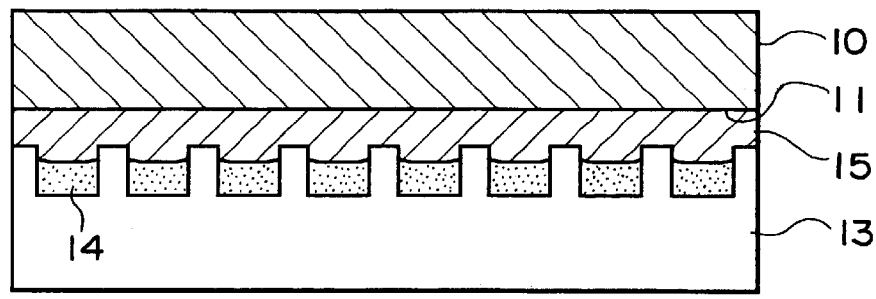

Meanwhile, as shown in FIG. 1B, color pattern layers 14 are formed on a template 13. The method of forming the color pattern layers 14 on the template 13 will be described later.

Next, as shown in FIG. 1C, the treated surface 11 of the substrate 10 and the surface of the template 13 where the color pattern layers 14 are formed are adhered together with a resin layer 15 interposed.

The material of the resin layer 15 is not restricted, provided it has transparency such as not to impair the color characteristics of the color pattern layers 14, and various resins may be used. In particular, acrylic resins of the type set by ultraviolet rays are well suitable, since a variety of commercially available resins and photosensitive materials may be used to give excellent optical characteristics, and moreover the resulting product can be set in a short time.

As specific instances of the basic composition of acrylic resins set by ultraviolet rays may be cited prepolymers, oligomers, monomers, and optical polymerization initiators.

As prepolymers or oligomers may be used, for example, acrylate-based substances such as epoxy acrylates, urethane acrylates, polyester acrylates, polyether acrylates, and spiroacetal acrylates; or methacrylate-based substances such as epoxy methacrylates, urethane methacrylates, polyester methacrylates, and polyether methacrylates.

As monomers may be used, for example, monofunctional monomers such as 2-ethylhexyl acrylate, 2-ethylhexyl methacrylate, 2-hydroxyethyl acrylate, 2-hydroxyethyl methacrylate, N-vinyl-2-pyrrolidone, carbitol acrylate, tetrahydrofurfuryl acrylate, isobornyl acrylate, dicyclopentenyl acrylate, and 1,3-butanediol acrylate; bifunctional monomers such as 1,6-hexanediol diacrylate, 1,6-hexanediol dimethacrylate, neopentylglycol diacrylate, neopentylglycol dimethacrylate, ethylene glycol diacrylate, polyethylene glycol diacrylate, and pentaerythritol diacrylate; and polyfunctional monomers such as trimethylol propane acrylate, trimethylol propanetri methacrylate, pentaerythritol triacrylate, and dipentaerythritol hexacrylate.

As optical polymerization initiators may be used, for example, acetophenones such as 2,2-dimethoxy-2-phenylacetophenone; butylphenones such as α-hydroxy isobutylphenone and p-isopropyl-α-hydroxyisobutylphenone; halogenated acetophenones such as p-tert-butyldichloroacetophonone, p-tert-butyl trichloroacetophenone, and α,α-dichloro-4-phenoxyacetophenone; benzophenone such as benzophenone and N,N-tetraethyl-4,4-diaminobenzophenone; benzyl such as benzyl and benzyl dimethyl ketals; benzoin compounds such as benzoin and benzoin alkylethers; oxime compounds such as 1-phenyl-1,2-propanedion-2-(o-ethoxycarbonyl)oxime; xanthone such as 2-methylthioxanthone and 2-chlorothioxanthone; benzoin ethers such as benzoin other and isobutyl benzoin ether; and radical generating compounds such as Michler's ketone and benzylmethyl ketals.

It should be noted that if necessary, to prevent impairment of setting by oxygen, amines or other compounds may be added, and to facilitate the painting, a solvent ingredient may be added. There is no particular restriction on the solvent ingredient added, and various organic solvents may be used, such as, for example, propylene glycol monomethyl ether acetate, methoxy methyl proprionate, ethoxy ethyl proprionate, ethyl lactate, ethyl pyruvinate, or ethyl amyl ketone.

Such an acrylic resin to be set by ultraviolet rays is spread in a predetermined quantity on at least one of the surface 11 of the substrate 10 treated by the activated species and the surface of the template 13 on which the color pattern layers 14 are formed, the two are brought together and irradiated with ultraviolet rays from the substrate side for a predetermined time to effect the setting.

Figure 1D:
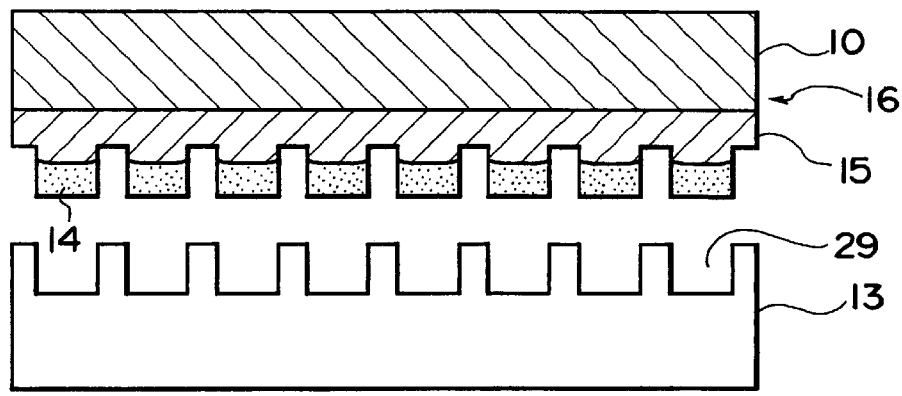

In this way, when the substrate 10, color pattern layers 14 and resin layer 15 are brought together, and these are then separated from the template 13, the completed product 16 of a color filter shown in FIG. 1D is obtained.

Next the method of forming the color pattern layers 14 on the template 13 is described. FIGS. 3A to 3E show an example process of making the template 13 of an embodiment of the invention.

Specifically, the following method is used.

Figure 3A:
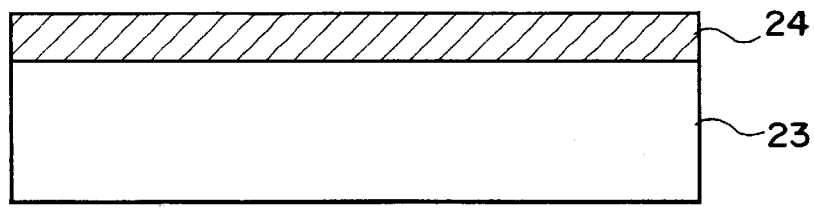
FIGS. 3A to 3E illustrate the process of making a template having ink filling concavities in the first embodiment of the invention.

First, as shown in FIG. 3A, a resist layer 24 is formed on a substrate 23.

The substrate 23 has its surface etched to form the template, and here a silicon wafer is used. The technology of etching a silicon wafer is established in the art of making semiconductor devices, and enables highly precise etching be carried out. It should be noted that as long as the substrate 23 is a material which can be etched, it is not restricted to being a silicon wafer, and for example a plate or film of glass, quartz, resin, metal, ceramic, or other material may be used.

As the material forming the resist layer 24, may be used a commercially available positive resist as generally used in the fabrication of semiconductor devices, being a cresol novolac type resin to which a diazo-naphthoquinone derivative is added as a photosensitive material. Here the positive resist refers to a substance which can be selectively removed by developer in an area which is exposed to radiation in accordance with a predetermined pattern.

As a method of forming the resist layer 24, may be used, for example, the spin-coating method, dipping method, spray-coating method, roll-coating method, or bar-coating method.

Figure 3B:
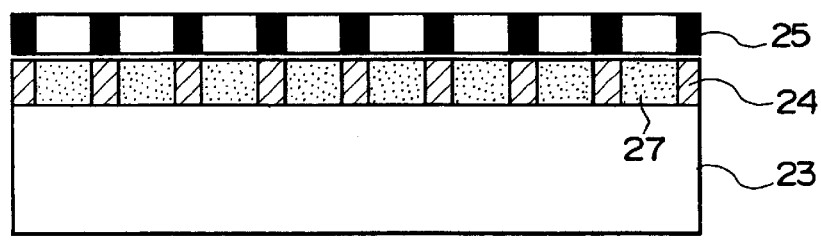

Next, as shown in FIG. 3B, a mask 25 is disposed on the resist layer 24, and selected regions only of the resist layer 24 are exposed through the mask 25 to radiation 26.

Figure 3C:
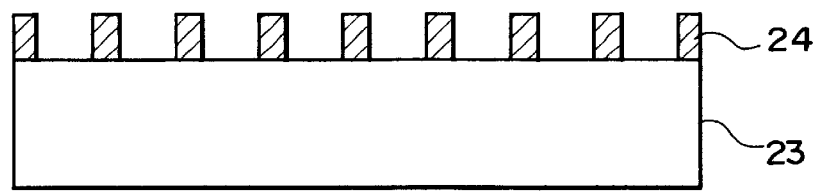
Figure 3D:
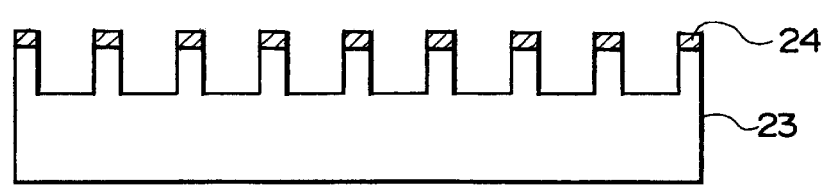
Figure 3E:
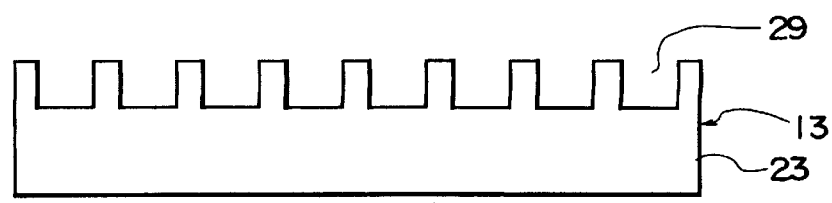

The mask 25 is patterned so as to transmit the radiation 26 only in those regions corresponding to ink filling concavities 29 shown in FIG. 3E. Besides, the ink filling concavities 29 are formed to correspond to the form and layout of the colors of the color filter to be made, and for example for a 10-inch VGA type liquid crystal panel, approximately 900,000 pixels, 640×480×3 (colors), at approximately 100 μm pitch, or in other words approximately 900,000 individual ink filling concavities 29 are formed.

After the resist layer 24 has been exposed to the radiation 26, developing is carried out under predetermined conditions, and as shown in FIG. 3C, the resist in the radiation-exposed regions 27 only is selectively removed, exposing the substrate 23, while other regions remain covered by the resist layer 24.

When the resist layer 24 is patterned in this way, as shown in FIG. 3D, with the resist layer 24 as a mask, the substrate 23 is etched to a particular depth.

The method of etching may be wet etching or dry etching, but according to the material of the substrate 23, the method of etching and the conditions may be chosen to be optimum from a consideration of the etching cross-sectional shape, the etching rate, and so forth. For controllability dry method is superior, and a device using, for example the parallel flat plate reactive ion etching (RIE) method, the inductive coupled plasma (ICP) method, the electron cyclotron resonance (ECR) method, helicon wave excitation method, magnetron method, plasma etching method, ion beam etching method or the like may be used, and by varying the etching gas, the gas flow rate, the gas pressure, the bias voltage, and other conditions, the ink filling concavities 29 may be formed in an oblong shape, a taper may be applied, the surface may be made rough, and a desired etching shape may be obtained.

Next, after etching is completed, as shown in FIG. 3E, the resist layer 24 is removed, and the substrate 23 having the ink filling concavities 29 is obtained, and this forms the template 13.

This template 13, once made, can be used as many times as necessary, within the limits of durability, and is thus economical. The process of making the template 13 can be omitted in the process of making the second and subsequent color filters, enabling the number of steps in the process to be reduced and the cost to be reduced.

In the above embodiment, when the ink filling concavities 29 are formed on the substrate 23, a positive resist is used, but equally a negative resist, in which regions exposed to radiation are rendered insoluble in a developer, and the regions not exposed to radiation are selectively removed by the developer, may be used; in this case the mask used has a pattern which is the inversion of the pattern of the mask 25. Alternatively, instead of using a mask, a laser beam or electron beam may be used to directly expose the resist in a pattern.

After the template 13 having the ink filling concavities 29 is thus obtained, next the ink filling concavities 29 are filled with predetermined colored inks, to form a color pattern layer. There are no particular restrictions on the method used to fill the ink filling concavities 29 with colored inks, but an inkjet method is preferred. According to the inkjet method, the practical technology developed for inkjet printers can be employed, enabling the filling operation to be carried out rapidly and economically, with no ink waste.

Figure 4:
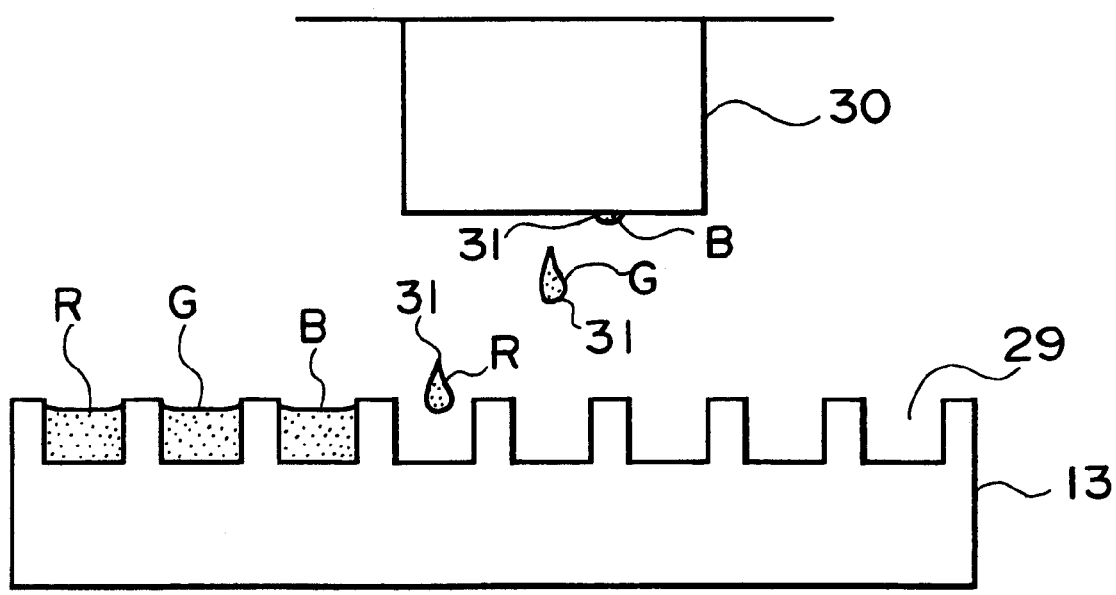
FIG. 4 illustrates the step of filling with ink the ink filling concavities in the first embodiment of the invention.

FIG. 4 shows the ink filling concavities 29 being filled with inks 31, for example, red ink R, green ink G, and blue ink B by an inkjet head 30. The inkjet head 30 is disposed facing the ink filling concavities 29 on the template 13, and the colored inks 31 are ejected into the ink filling concavities 29.

The head 30 is for example one developed for an inkjet printer, and may for example be a Piezo Jet Type employing a piezoelectric element, or a Bubble Jet Type employing a electrothermal conversion as an energy producing element, and the color areas and color pattern can be determined as required.

For example, if the head 30 has twenty ink ejecting nozzles for each of R, G and B, and a drive frequency of 14.4 kHz (14400 ejection cycles per second), then if three drops of ink are ejected into each of the ink filling concavities 29, to fill with ink the ink filling concavities 29 of a 10-inch VGA type color filter with approximately 900,000 pixels, the time required is:

900,000×3 drops/(144000 cycles×20 nozzles×3 colors)=approximately 3 seconds

Here, even when the time for the head 30 to move from one ink filling concavity 29 to the next is included, the template 13 can be filled with ink in about 2 or 3 seconds.

Thus all of the ink filling concavities 29 are filled with ink. If a solvent ingredient is included in ink, heat treatment is carried out to volatilize the ink solvent.

In this way, as shown in FIG. 1B, the color pattern layer 14 is formed on the template 13, and by means of the steps shown in FIGS. 1C and 1D, the completed product 16 of a color filter is obtained.

Figure 5A:
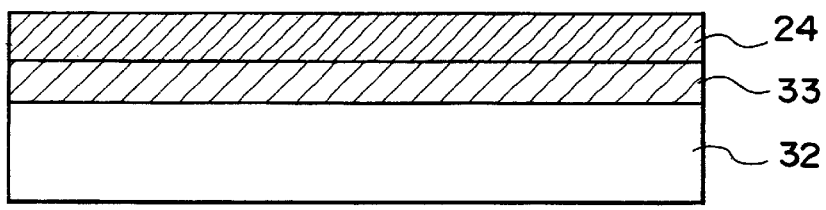
FIGS. 5A to 5E illustrate the process of formation of the ink filling concavities on the template by a second method in the first embodiment of the invention.

Next, a second method of forming the color pattern layer 14 on the template is described. First, as shown in FIG. 5A, a layer 33 of a material for forming pixel partition portions, and a resist layer 24 are formed in sequence on a template 32.

The template 32 is not restricted as long as it fulfills the role of supporting the pixel partition portions, It determines the surface form of the color filter, it is capable of being formed to the desired surface form, and it withstands the process; for example a plate or film of a silicon wafer, glass, quartz, resin, metal, ceramic, or other material may be used. Here a glass template is used, which has its surface polished to a flat using a cerium oxide type polishing agent, and is then washed and dried.

The material of the pixel partition portions is such as not to create a problem of surface reflection when the panel is formed, and is not particularly restricted as long as it is capable of being formed according to the form and layout of the color pattern of the color filter to be made; various resins, silicon materials, glass materials, metal materials, or ceramic materials can be used. Here an acrylic resin set by ultraviolet rays is used. As the components of an acrylic resin set by ultraviolet rays, may be used the same materials as those described above for forming the resin layer 15, and description is omitted here.

After the acrylic resin set by ultraviolet rays has been applied to the template 32 up to a predetermined thickness, ultraviolet rays are applied for a predetermined time for setting it, to form the layer 33 of a material for forming pixel partition portions. As a method of forming the layer of acrylic resin set by ultraviolet rays, may be used, for example, the spin-coating method, dipping method, spray-coating method, roll-coating method, or bar-coating method.

Besides, as the material and method for forming the resist layer 24, may be used the same materials and methods as described above for forming that in FIG. 3A, and description is omitted here.

Figure 5B:
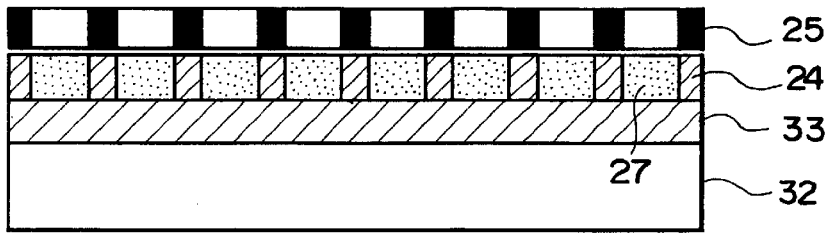

Next, as shown in FIG. 5B, the mask 25 is disposed on the resist layer 24, and selected regions only of the resist layer 24 are exposed through the mask 25 to radiation 26. The mask 25 is the same as used in the description of FIG. 3B above, and description is omitted here.

Figure 5C:
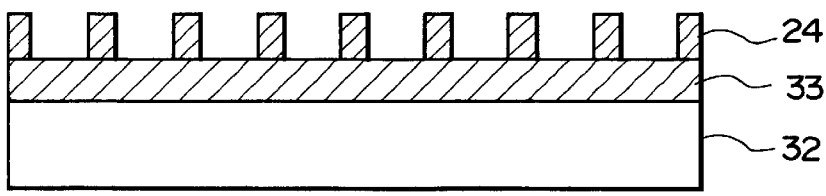

After the resist layer 24 has been exposed to the radiation 26, developing process is carried out under predetermined conditions, and as shown in FIG. 5C, the radiation-exposed regions 27 only by the radiation 26 is selectively removed, exposing the layer 33 of a material for forming pixel partition portions, while other regions remain covered by the resist layer 24.

Figure 5D:
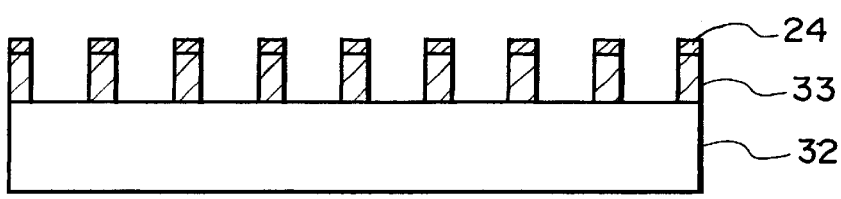

When the resist layer 24 is patterned in this way, as shown in FIG. 5D, with the resist layer 24 as a mask, the layer 33 of a material for forming pixel partition portions is etched up to a particular depth. The method of etching used may be the same as in the description of FIG. 3D above, and description is omitted here.

Figure 5E:
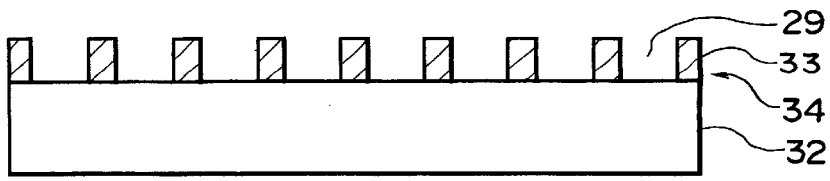

Next, after etching is completed, as shown in FIG. 5E, the resist layer 24 is removed to form pixel partition portions 34, and the areas divided up by pixel partition portions 34 form the ink filling concavities 29.

In the above embodiment, when the pixel partition portions 34 are formed, a positive resist is used, but equally a negative resist, in which regions exposed to radiation are rendered insoluble in a developer, and the regions not exposed to radiation are selectively removed by the developer, may be used; in this case the mask used has a pattern which is the inversion of the pattern of the mask 25. Alternatively, instead of using a mask, a laser beam or electron beam may be used to directly expose the resist in a pattern.

As the material for forming the pixel partition portions, may be used any material capable of patterning by exposure to radiation in a pattern, either directly or through a mask, and by development. This case is economical, because the resist layer 24 and the operation of etching are not required.

Besides, an opaque material is used as the material for forming the pixel partition portions, the pixel partition portions can double as a BM.

Figure 6A:
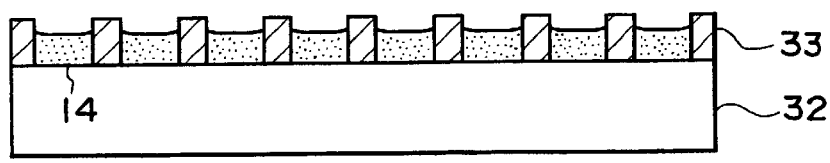
FIGS. 6A and 6B illustrate the process of making a color filter from the ink filling concavities formed by the second method in the first embodiment of the invention.

After the ink filling concavities 29 are thus formed on the template 32, next the ink filling concavities 29 are filled with predetermined colored inks, and as shown in FIG. 6A, color pattern layers 14 are formed. The method used to fill the ink filling concavities 29 with colored inks may be the same as the inkjet method in the description of FIG. 4 above, and description is omitted here.

Figure 6B:
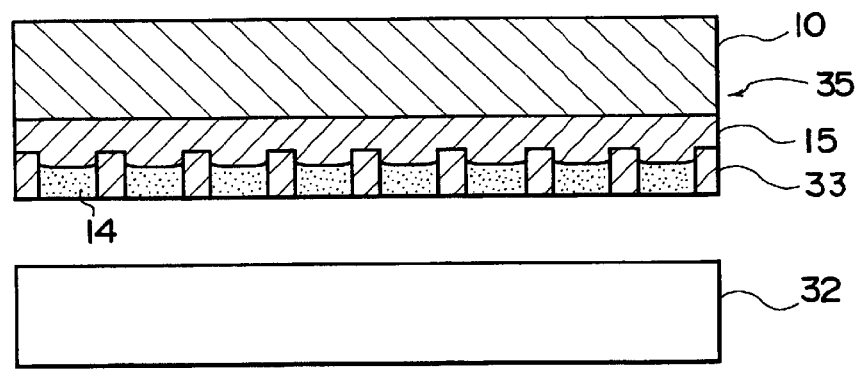

Then, by the same process as described above in FIGS. 1C and 1D, the completed product 35 of a color filter shown in FIG. 6B is obtained.

Next, a third method of forming the color pattern layers 14 on the template is described.

First, a second template having convex portions corresponding to the form and layout of the color pattern layers to be formed is made.

Specifically, the following method is used.

Figure 7A:
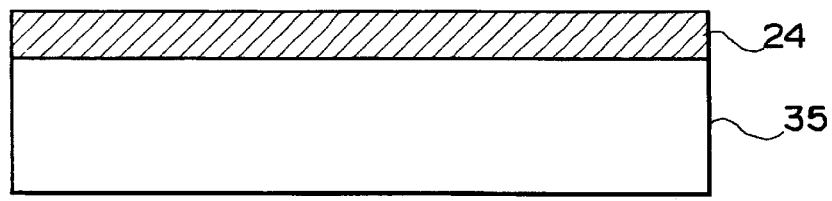
FIGS. 7A to 7E illustrate the process of making a second template for the formation of the ink filling concavities on the template by a third method in the first embodiment of the invention.

First, as shown in FIG. 7A, a resist layer 24 is formed on a substrate 35.

The substrate 35 has its surface etched to form the second template, and here a quartz substrate is used. It should be noted that substrate 35 is not limited to being a quartz substrate, as long as it is a material which can be etched, and for example a plate or film of glass, silicon wafer, resin, metal, ceramic, or other material may be used.

The material and method of forming of the resist layer 24 may be the same as in the description of FIG. 3A above, and description is omitted here.

Figure 7B:
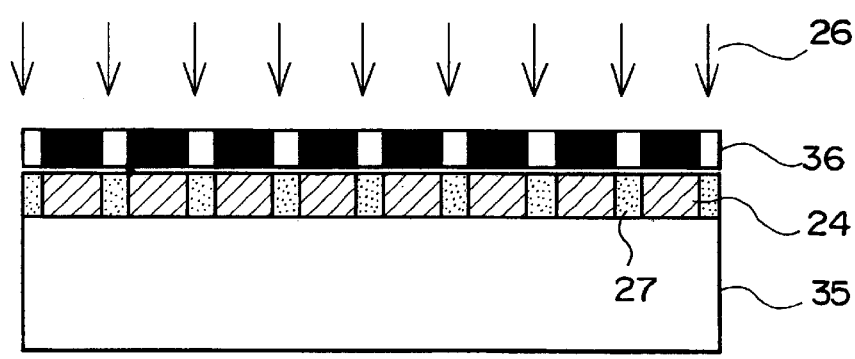

Next, as shown in FIG. 7B, a mask 36 is disposed above the resist layer 24, and selected regions only of the resist layer 24 are exposed through the mask 36 to radiation 26.

The mask 36 is patterned so as to transmit the radiation 26 only in those regions other than the regions corresponding to the convexities to be formed, and differs from that shown in FIG. 3B only in that the pattern is inverted.

Figure 7C:
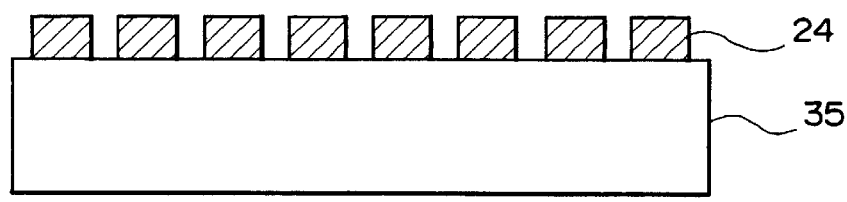

After the resist layer 24 has been exposed to the radiation 26, developing process is carried out under predetermined conditions, and as shown in FIG. 7C, the radiation-exposed regions 27 only is selectively removed, exposing the substrate 35, while other regions remain covered by the resist layer 24.

Figure 7D:
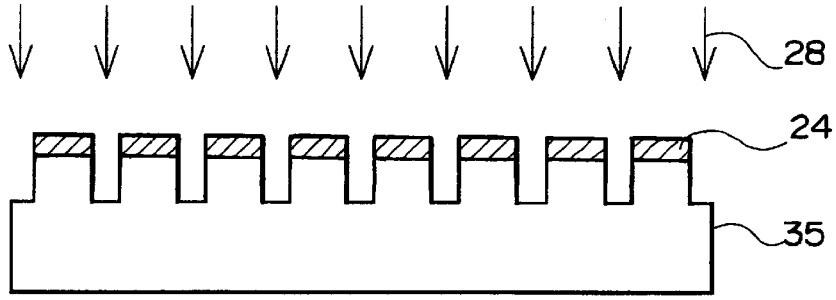

When the resist layer 24 is patterned in this way, as shown in FIG. 7D, with the resist layer 24 as a mask, the substrate 35 is etched up to a particular depth. The method of etching used may be the same as in the description of FIG. 3 above, and description is omitted here.

Figure 7E:
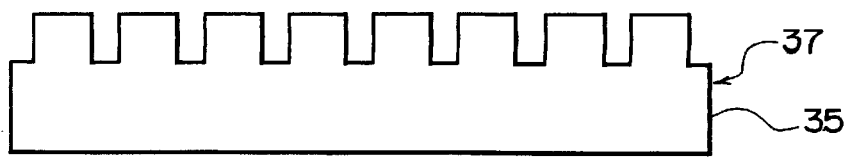

Next, after etching is completed, as shown in FIG. 7E, the resist layer 24 is removed, forming a second template 37. This second template 37, once made, can be used as many times as necessary, within the limits of durability, and is thus economical.

The steps after the second template 37 is thus obtained are shown in FIGS. 8A to 8D.

Figure 8A:
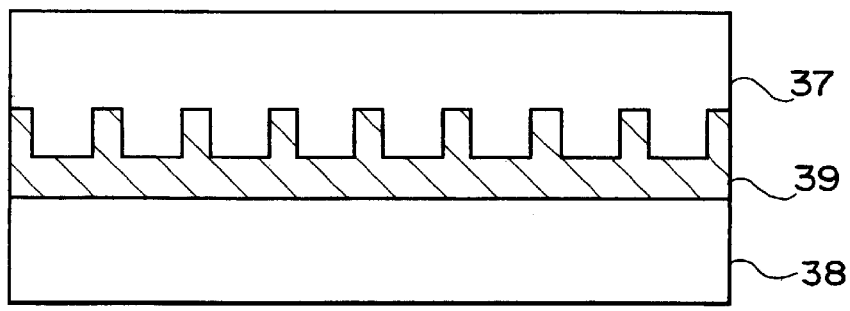
FIGS. 8A to 8D illustrate the process of forming the ink filling concavities by the third method in the first embodiment of the invention, and making a color filter.

First, as shown in FIG. 8A, using a material for forming an ink filling layer, the relief pattern of the second template 37 is formed by transfer on a template 38, forming an ink filling layer 39 thereon.

The template 38 functions to support the ink filling layer 39, and to determine the surface form of the color filter, and is not subject particularly to restriction as long as it is capable of being formed to the desired surface form and of withstanding the process, and for example, a plate or film of silicon wafer, glass, quartz, resin, metal, ceramic, or other material may be used. Here a quartz wafer polished to a mirror finish is used. This template 38, once made, can be used as many times as necessary, within the limits of durability, and is thus economical.

Figure 8B:
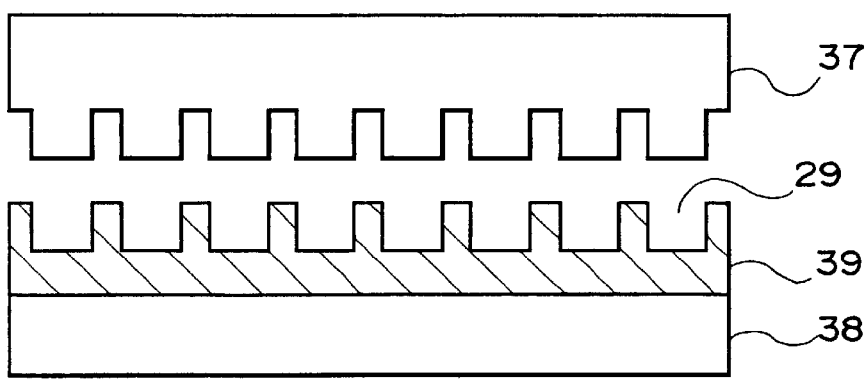
Figure 8C:
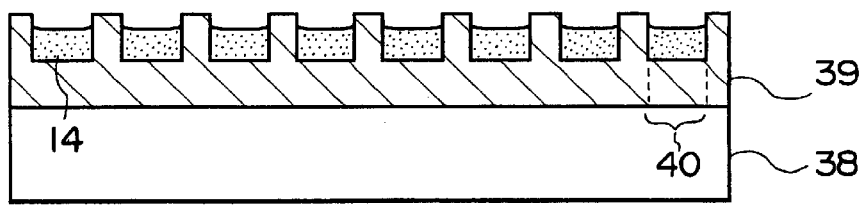
Figure 8D:
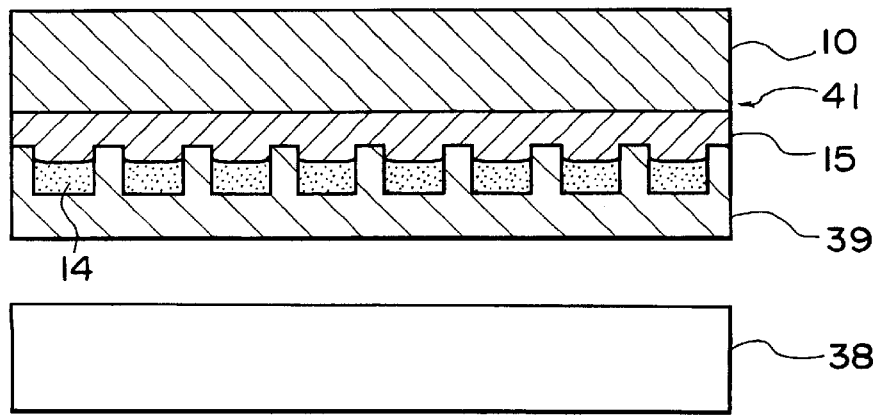

The material for forming the ink filling layer 39 is not subject particularly to restriction as long as in regions 40 for forming the color pattern layer shown in FIG. 8C, that is to say, at the thickness of the bottom of the ink filling concavities 29, it has sufficient optical transmissivity not to impair the color characteristics of the color pattern layer 14, and various resins, glass materials, metal materials, or ceramic materials can be used, and it is preferably a liquid material which can be set by applying energy. By using a liquid material for the ink filling layer 39, the material for forming the ink filling layer can easily be injected into even the fine parts of the concavities on the second template 37, and therefore, the relief pattern on the second template 37 can be precisely transferred to the ink filling layer 39.

As such a material, may be used, for example, a resin set by ultraviolet rays. As such resins set by ultraviolet rays. acrylic resins have outstanding transparency, and since various commercially available resins and photosensitive materials may be used, these are ideal. The components of the acrylic resin set by ultraviolet rays may be the same as in the resin layer 15 described above, and description is omitted here. The resin set by ultraviolet rays may be coated in a predetermined amount on to either or both of the template 38 and second template 37.

Next, the template 38 and second template 37 are superimposed, and at the point at which the resin set by ultraviolet rays has spread to a predetermined area, the resin set by ultraviolet rays is set by irradiation by ultraviolet rays for a predetermined time.

When thus using materials set by ultraviolet rays, it is essential that one of the template 38 and second template 37 transmits ultraviolet rays. Here, since the second template 37 transmits ultraviolet rays, the ultraviolet rays can be irradiated from the side of the second template 37.

Thus, when the resin set by ultraviolet rays has set, and the ink filling layer 39 is formed, the ink filling layer 39 is separated together with the template 38 from the second template 37, and as shown in FIG. 8B, the ink filling layer 39 having ink filling concavities 29 on the template 38 is obtained.

Next, the ink filling concavities 29 are filled with predetermined colored inks, and as shown in FIG. 8C, color pattern layers 14 are obtained. The method of filling the ink filling concavities 29 with colored inks may be the same inkjet method as in the description of FIG. 4 above, and description is omitted here.

Then, by the same process as described above in FIGS. 1C and 1D, the completed product 41 of a color filter shown in FIG. 5D is obtained.

According to the method of making a color filter described above, the adhesion between the substrate 10 and the resin layer 15 improves, and during the process of removal from the template, problems such as the resin layer 15 floating above or breaking away from the substrate 10 are prevented.

Thereafter, if required, a further over-coating layer may be formed on the color pattern layer 14, attaching transparent electrodes and an alignment layer, and being mounted on array.

(Second Embodiment)

Figure 9:
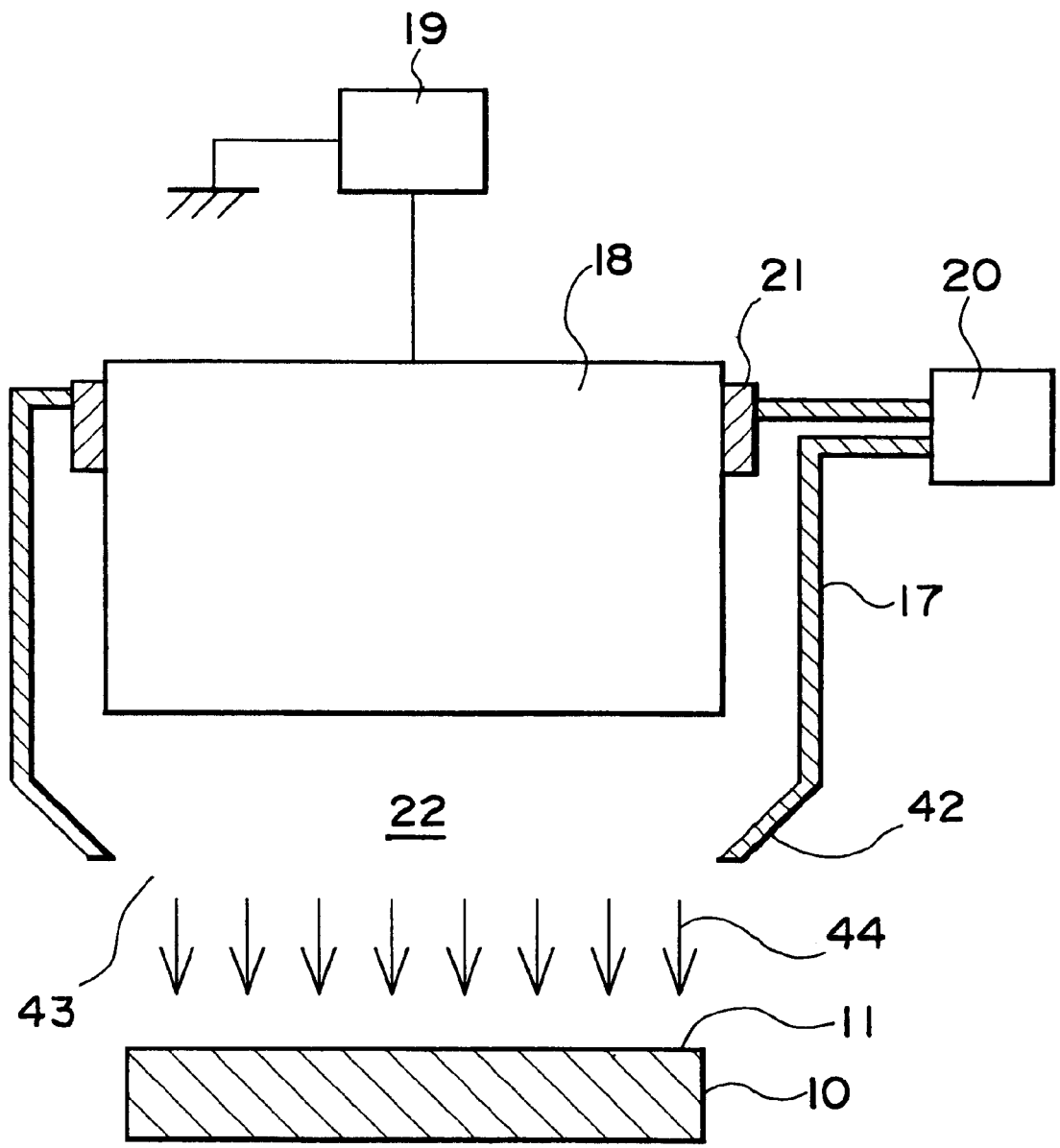
FIG. 9 is a schematic view of a device for treating a substrate in a second embodiment of the invention.

FIG. 9 is a schematic view of a device for treating a substrate in a second embodiment of the invention. In this device, the metallic cover 17 of the machine shown in FIG. 2 extends to the vicinity of the extremity of the discharge generating electrode 18, to form a counterelectrode 42 for generating the discharge. A gas outlet 43 is provided which is freely determined in accordance with the shape of the counterelectrode 42.

Within this device, as shown in FIG. 9, a substrate 10 is set at a predetermined distance from the gas outlet 43 with the treated surface 11 uppermost.

The substrate 10 is the same as in the first embodiment described above, and description is omitted here.

Next, in the same way as in the first embodiment described above, oxygen and helium gas is supplied into the metallic cover 17 by the gas supply device 20, and the interior atmosphere is replaced by oxygen and helium gas.

Here the helium gas serves to generate a discharge, and the same effect can be obtained from argon gas.

Next, high-frequency electric power is applied from the high-frequency power supply 19 to the discharge generating electrode 18, whereupon a discharge occurs between the discharge generating electrode 18 and the counterelectrode 42, forming a discharge portion 22. In the discharge portion 22 the oxygen gas is activated by processes including dissociation, ionization, and excitation, to form activated species.

The activated species are expelled from the gas outlet 43 together with the helium gas, as a reactive gas flow 44, is toward the substrate 10.

The oxygen ions, excited species, and other activated species in the reactive gas flow 44 react with the surface of the substrate 10, breaking the molecular bonds and oxidation on the surface, improving the wettability to the substrate 10 of the material used for forming the resin layer 15, and thus improving the contact of the resin layer 15 with the substrate 10.

Thereafter, the completed color filter is obtained in the same way as in the first embodiment described above.

The larger the size of the gas outlet 43, the better, and this is preferably larger than the treated surface 11 of the substrate 10. By this means the whole of the substrate 10 can be treated in a single operation, and therefore the treatment time is reduced, and since the substrate 10 can be treated while fixed, the load on the machine is lightened.

(Third Embodiment)

As described in the first and second embodiments above, the invention employs a chemical reaction for treatment, and this reaction is promoted by heat. Here, if a glass substrate or the like which is thermally stable is used as the substrate 10, then if the treatment is carried out with the substrate 10 heated, the treatment time can be reduced.

Figure 10:
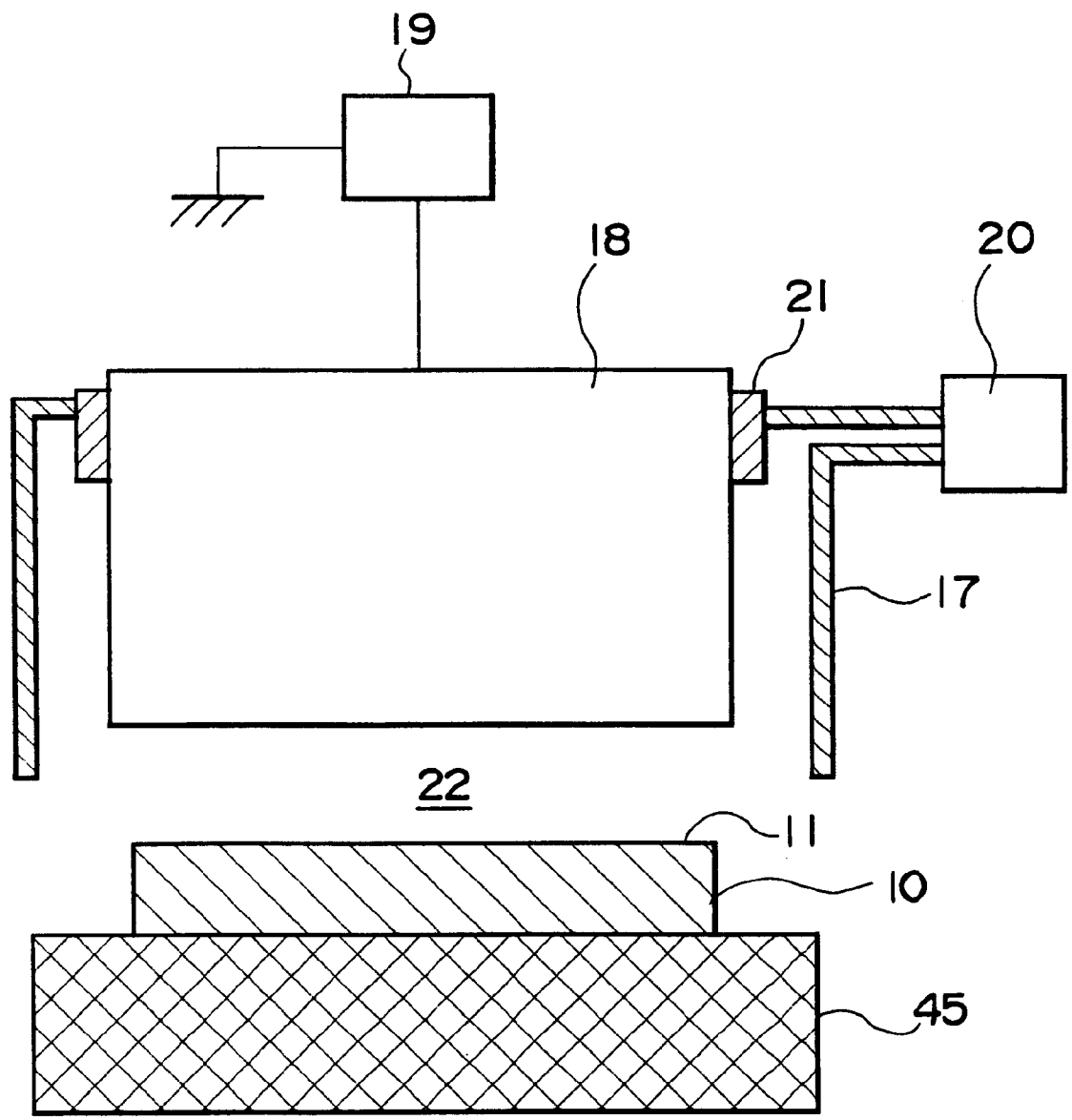
FIG. 10 is a schematic view of a device for treating a substrate in a third embodiment of the invention.

FIG. 10 is a schematic view of a device for treating a substrate in a third embodiment of the invention. This device has a device of the first embodiment shown in FIG. 2 and a heating device 45 as substrate support.

According to experiments by the inventors, if the substrate is treated while heated to about 150° C. using the above device, compared with treatment at room temperature, the treatment time can be reduced down to approximately one third.

On the other hand, when the substrate has low heat resistance, by carrying out the treatment with the substrate 10 cooled, deformation of the substrate 10 due to heat is limited. By replacing the heating device 45 as the substrate support in FIG. 10 by a cooling device, the treatment can be carried out with the substrate 10 in the cooled state.

(Fourth Embodiment)

FIGS. 11A to 11E illustrate the process of formation of an ink filling layer having ink filling concavities on a template in a fourth embodiment of the invention.

Specifically, the following method is used.

Figure 11A:
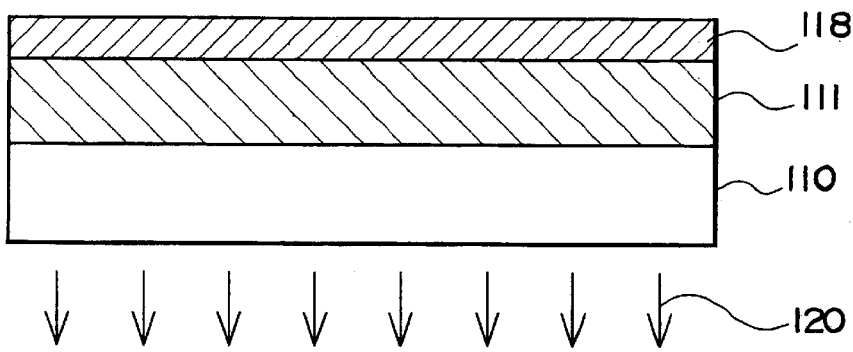
FIGS. 11A to 11E illustrate the process of formation of an ink filling layer having ink filling concavities on a template in a fourth embodiment of the invention.

First, as shown in FIG. 11A, an ink filling layer 111 is formed on a template 110, and a resist layer 118 is formed thereon. As a method of forming the resist layer 118, may be used, for example, the spin-coating method, dipping method, spray-coating method, roll-coating method, or bar-coating method.

The template 110 fulfills the role of supporting the ink filling layer 111, and of determining the surface form of the color filter, and is not restricted as long as it is capable of being formed to the desired surface form and of withstanding the processing; for example, a plate or film of silicon wafer, glass, quartz, resin, metal, ceramic may be used.

This template 110, once made, can be used as many times as necessary, within the limits of durability, and is thus economical.

Figure 11B:
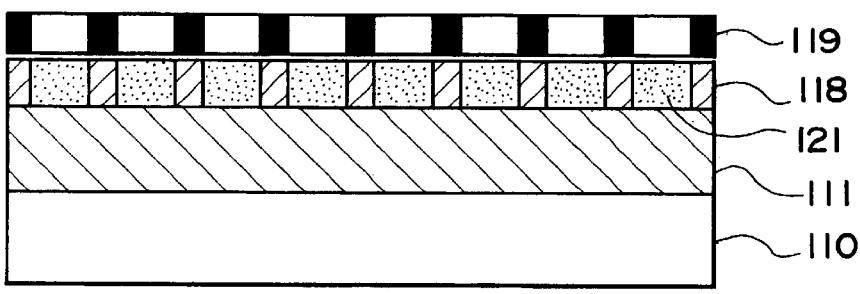
Figure 11C:
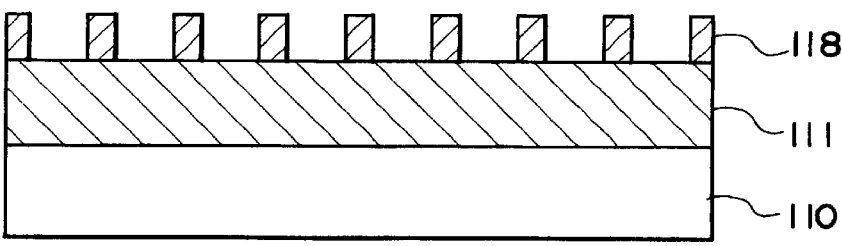
Figure 11D:
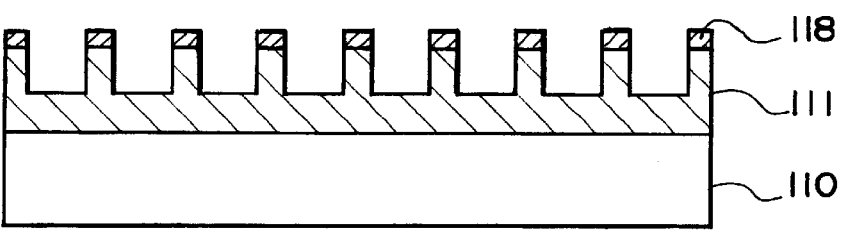
Figure 11E:
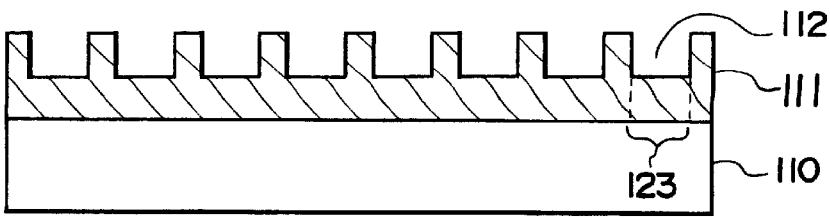

The material for forming the ink filling layer 111 is not subject particularly to restriction as long as in regions 123 for forming the color pattern layer shown in FIG. 11E, that is to say, at the thickness of the bottom of the ink filling concavities 112, it has sufficient optical transmissivity not to impair the color characteristics of the color pattern layer 115, and various resins, glass materials, metal materials, or ceramic materials can be used, and it is preferably a material which can be set by applying energy. As specific examples of energy, light, heat, or both light and heat are preferable. In this case it is essential that there is a component which can be set by light, heat, or both light and heat, and a variety of commercially available resins, photosensitive materials, and hardeners may be used. In particular, acrylic resins of the type set by ultraviolet rays, and epoxy resins cured by heat may preferably be used.

The material forming the resist layer 118 may for example be simply a commercially available positive resist as generally used in the fabrication of semiconductor devices, being a cresol novolac type resin to which a diazonaphthoquinone derivative is added as a photosensitive material. Here the positive resist refers to a substance which can be selectively removed by developer in an area which is exposed to radiation in accordance with a predetermined la pattern.

Next, as shown in FIG. 11B, a mask 119 is disposed above the resist layer 118, and selected regions only of the resist layer 118 are exposed through the mask 119 to radiation 120. The mask 119 is patterned so as to transmit the radiation 120 only in those regions corresponding to ink filling concavities 112 shown in FIG. 11E. Besides, the ink filling concavities 112 are formed to correspond to the form and layout of the colors of the color filter to be made, and for example for a 10-inch VGA type liquid crystal panel, approximately 900,000 pixels, 640×480×3 (colors), at approximately 100 pm pitch, or in other words approximately 900,000 individual ink filling concavities 112 are formed.

After exposure to the radiation 120, developing process is carried out, and as shown in FIG. 11C, regions of the resist layer 118 corresponding to the regions of the ink filling concavities 112, that is to say, the radiation-exposed regions 121 only, are selectively removed, exposing the ink filling layer 111, while other regions remain covered by the resist layer 118.

When the resist layer 118 is patterned in this way, as shown in FIG. 11D, with the resist layer 118 as a mask, the ink filling layer 111 is etched up to a particular depth.

The method of etching may be wet etching or dry etching, but according to the material forming the ink filling layer 111, an appropriate method may be chosen from a consideration of the etching cross-sectional shape, the etching rate, and so forth. For controllability dry etching is superior, and a device using, for example the parallel flat plate reactive ion etching (RIE) method, the inductive coupled plasma (ICP) method, the electron cyclotron resonance (ECR) method, helicon wave excitation method, magnetron method, plasma etching method, ion beam etching method or the like may be used, and by varying the etching gas, the gas flow rate, the gas pressure, the bias voltage, and other conditions, the ink filling concavities 112 may be formed in an oblong shape, a taper may be applied, the surface may be made rough, and a desired etching shape may be obtained.

Next, after etching is completed, the resist layer 118 is removed, and as shown in FIG. 11E, the ink filling layer 111 having the ink filling concavities 112 is formed on the template 110.

Figure 12A:
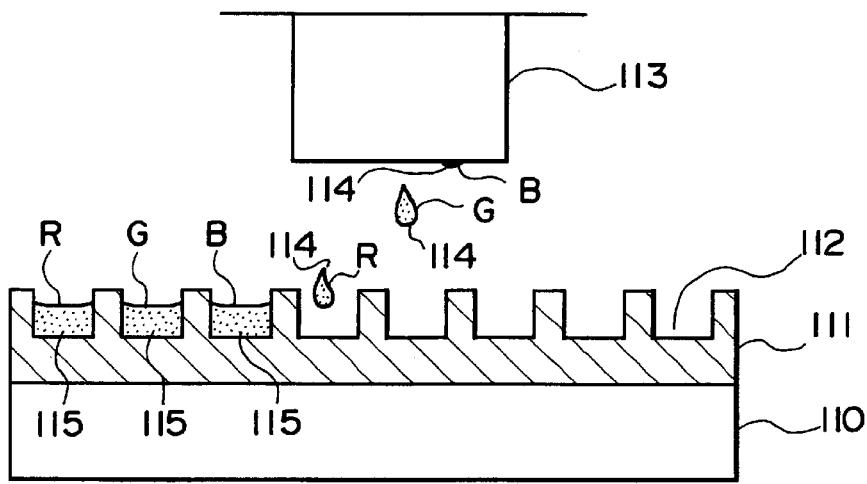
FIGS. 12A to 12C illustrate the process after formation of the ink filling layer having ink filling concavities on the template in the fourth embodiment of the invention.
Figure 12B:
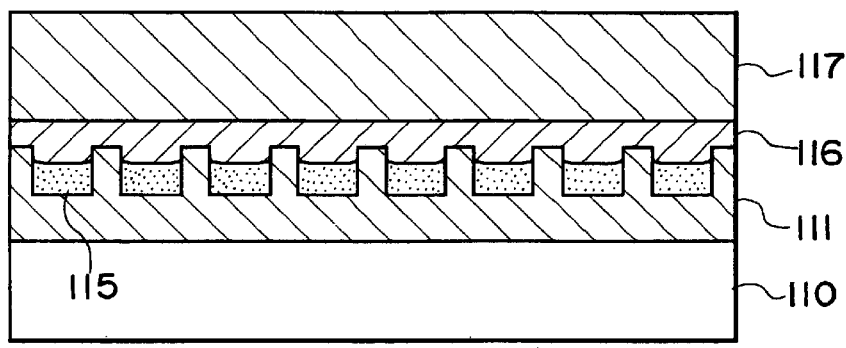
Figure 12C:
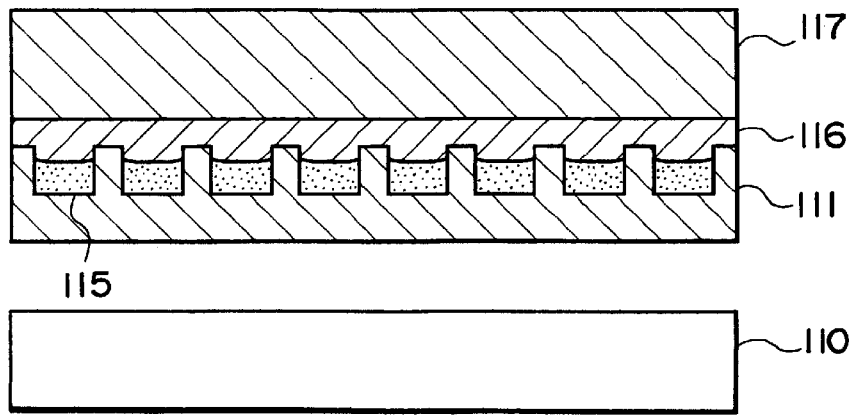

After the ink filling layer 111 having the ink filling concavities 112 on the template 110 has been formed, the following procedure is illustrated in FIGS. 12A to 12C. In FIG. 12A, a head 113 ejecting ink by the inkjet method is disposed facing the ink filling concavities 112 formed in the ink filling layer 111 on the template 110.

The head 113 is, for example, one developed for an inkjet printer, and may for example be a Piezo Jet Type employing a piezoelectric element, or a Bubble Jet Type employing a electrothermal conversion as an energy producing element, and the color areas and color pattern can be determined as required.

For example, if the head 113 has twenty ink ejecting nozzles for each of red ink R, green ink G and blue ink B, and a drive frequency of 14.4 kHz (14400 ejection cycles per second), then if three drops of ink are ejected into each of the ink filling concavities 112, to fill with ink the ink filling concavities 112 of a 10-inch VGA type color filter with approximately 900,000 pixels, the time required is:

900,000×3 drops/(144000 cycles×20 nozzles×3 colors)=approximately 3 seconds

Here, even when the time for the head 113 to move from one ink filling concavity 112 to the next is included, the plate can be filled with ink in about 2 to 3 seconds.

It should be noted that with the pigment dispersion method, the time taken to form each color by the lithography method is a minimum of 30 minutes, and therefore a color filter with three colors of R, G and B requires a minimum of at least 90 minutes. By comparison with this, in the present embodiment, the ink filling can be carried out in 2 to 3 minutes, and the subsequent stages from resin painting to removal can be carried out in about 3 to 5 minutes, so that the color filter can be formed in a short time compared with the conventional case.

FIG. 12A shows a state where the ink filling concavities 112 are filled with inks 114, for example R, G and B by the head 113, to form the color pattern layer 115. The inks 114 may equally include a material including the coloring material which can be set by applying energy.

This component is not subject particularly to restriction as long as it does not affect the color characteristics of the coloring materials of each of the colors, and does not cause problems such as solidification within the ink, and may for example be a resin including a component which can be set or cured by any one of light, heat and both of them. Specifically, acrylic resins, epoxy resins and so on, for which commercially available and various light sensitive materials, hardeners and so forth can be used, may preferably be used.

Thus all of the ink filling concavities 112 are filled with ink. If an ink solvent ingredient is included, heat treatment is carried out to volatilize the ink solvent. The conditions for this heat treatment may be determined considering the boiling point of the solvent ingredient included in the ink. The solvent ingredient used in the ink is not subject particularly to restriction, and water, or a variety of organic solvents may be used, but evaporation of the solvent while the ink is used clogs the ink nozzles or the ink pathways of the head 113 with solidified ink. For this reason, the solvent used in the ink preferably has a high boiling point. On the other hand, however, in order not to obstruct the removal of the solvent, a high boiling point is undesirable. A preferable range for the boiling point of the solvent is 80 to 200° C. In this case the conditions for heat treatment are at 50 to 200° C., and from 2 to 10 minutes when using a hotplate or from 20 to 30 minutes when using a baking oven.

Besides, the color pattern layer 115 shrinks when the solvent is removed, and it is necessary to supply an ink amount sufficient to ensure the required color concentration for the thickness after shrinking.

Next, as shown in FIG. 12B, a resin layer 116 is formed on the ink filling layer 111 on which the color pattern layers 115 are formed, and a glass substrate 117 is placed thereon.

The material forming the resin layer 116 is one which is set by applying energy for example, and must have optical transmissivity after set. As such a component may be cited, for example, a resin including a component which is set or cured by any one of light, heat and both of them. Specifically, acrylic resins, epoxy resins and so on, for which commercially available and various light sensitive materials, hardeners and so forth can be used, may preferably be used.

The resin thus having energy-set properties is coated on the color pattern layers 115 to form the resin layer 116, Then the glass substrate 117 for strengthening is placed thereon, and energy is applied, setting the resin layer 116 to cause adhesion to the glass substrate 117. Depending on the purpose, the glass substrate 117 may be replaced by a film as substrate.

In particular, if both of the color pattern layer 115 and resin layer 116 are selected so as to be able to be set by the same energy, the resin may be coated before the color pattern layer 115 is set, and by applying energy simultaneously to both, both may be set simultaneously, thus allowing unitary hardening.

Besides, in the stop shown in FIG. 121, a glass substrate 117 having optical transmissivity is mounted on the resin layer 116 as a reinforcing plate, and as a result, the strength of the color filter can improve.

In this way, by forming the ink filling layer 111, color pattern layers 115, resin layer 116, and glass substrate 117 in a unitary fashion, these are separated from the template 110, the completed product of a color filter can be obtained, as shown in FIG. 12C.

It should be noted that depending on the materials used, the adhesion force between the template 110 and the ink filling layer 111 may increase, and it may become difficult to separate the ink filling layer 111 from the template 110, and this may increase the number of produced items which are defective because of falling off of the ink filling layer 111 or color pattern layers 115 or the creation of cracks, and lead to problems such as increased time taken for separation, reducing production efficiency, and further a reduction of the durability of the template 110.

Here, it is preferable that before forming the ink filling layer 111 on the template 110, a release agent is coated on at least the regions of the surface of the template 110 on which the ink filling layer 111 is to be formed, or alternatively a release agent is added to the material used to form the ink filling layer 111, whereby the ink filling layer 111 is made easier to separate from the template 110. As the method of applying the release agent, may be used, for example, the spin-coating method, dipping method, spray-coating method, roll-coating method, bar-coating method, or vapor treatment, and so forth.

Besides, as shown in FIG. 13, in at least the regions of the surface of the template 110 in which the ink filling layer 111 is to be formed, may be formed a releasing layer 124 of a material improving the ease of separation of the ink filling layer 111, that is to say, a material of low adhesion to the ink filling layer 111. As the releasing layer 124, may be preferably used a metal being any one of Ni, Cr, Ti, Al, Cu, Ag, Au, or Pt, or an alloy of two or more of these, or a compound including at least one of these. These materials have generally low adhesion to acrylic resins which are preferably used in view of their excellent light transmissivity as the material for forming the ink filling layer 111, and may be formed as a highly controllable film, using vacuum film formation method such as sputtering, vapor deposition, or CVD. It should be noted that the thickness of this releasing layer 124 may be of the order of tens to thousands of Angstroms.

In the above embodiment, when the ink filling layer 111 is formed, a positive resist is used, but equally a negative resist, in which regions exposed to radiation are rendered insoluble in a developer, and the regions not exposed to radiation are selectively removed by the developer, may be used; in this case the mask used has a pattern which is the inversion of the pattern of the mask 25. Alternatively, instead of using a mask a laser beam or electron beam may be used to directly expose the resist.

(Fifth Embodiment)

Next, FIGS. 14A to 14C illustrate the process of forming an ink filling layer having ink concavities in a fifth embodiment of the invention.

Specifically, the following method is used.

First, as shown in FIG. 14A, a resist layer 125 is formed on a template 110. As a method of forming the resist layer 125, may be used, for example, the spin-coating method, dipping method, spray-coating method, roll-coating method, or bar-coating method.

The template 110 may be the same as in the description of the fourth embodiment in FIGS. 11A to 11E above, and description is omitted here.

The material for forming the resist layer 125 is not subject particularly to restriction as long as in regions 123 for forming the color pattern layer as shown in FIG. 14C, that is to say, at the thickness of the bottom of the ink filling concavities 1121 it has sufficient optical transmissivity not to impair the color characteristics of the color pattern layer, and for example, acrylic resins are preferably used, having excellent transparency and being able to have excellent patterning characteristics by using a variety of commercially available resins, photosensitive materials, and hardener. In this embodiment a positive resist is used.

Next, as shown in FIG. 14B, a mask 119 is disposed above the resist layer 125, and predetermined regions only of the resist layer 125 are exposed through the mask 119 to radiation 120. The mask 119 may be the same as in the description of the fourth embodiment in FIG. 11B above, and description is omitted here.

As shown in FIG. 14C, after exposure to the radiation 119, developing process is carried out, and when the regions 121 exposed to the radiation are removed up to the depth required for the ink filling concavities 112, the development is stopped. Whereas normal resist development is carried out to remove the whole thickness of the resist layer, in the invention the development of the resist layer 125 is interrupted at an intermediate point, so that it is necessary to control precisely the end point of the development by experimentally determining beforehand in detail the relation between the radiation exposure amount and the development time and the depth to which removal is carried out by the development. Moreover, by optically monitoring the progress of the development and detecting the development end point, it is possible to control the development even more precisely.

When the resist layer 125 has been removed to a predetermined depth by development in this way, the ink filling layer 111 having the ink filling concavities 112 is obtained.

Next, in the same way as in the fourth embodiment described above, by the steps shown in FIGS. 12A to 12C, the color filter is obtained.

In the above embodiment, when forming the ink filling layer, a positive resist is used, but in the same way as described in the fourth embodiment above, equally a negative resist may be used, in which case the mask used has a pattern which is the inversion of the pattern of the mask 119. Alternatively, instead of using a mask, a laser beam or electron beam may be used to directly expose the resist.

(Sixth Embodiment)

Figure 15A:
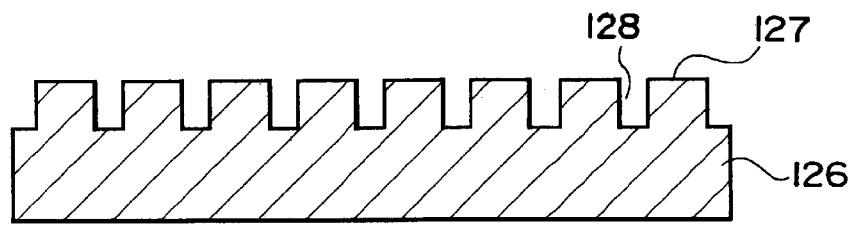
FIGS. 15A to 15C illustrate the process of formation of an ink filling layer having ink filling concavities on a template in a sixth embodiment of the invention.
Figure 15B:
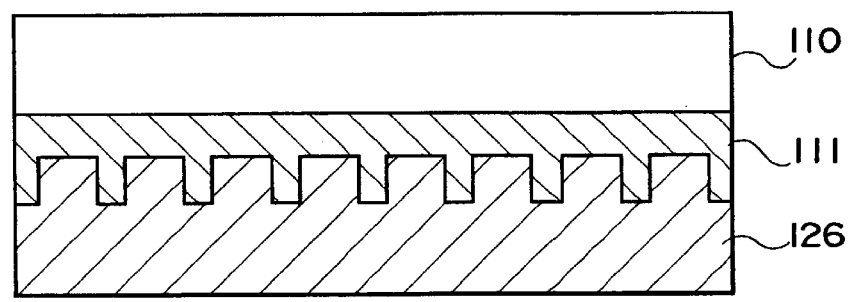
Figure 15C:
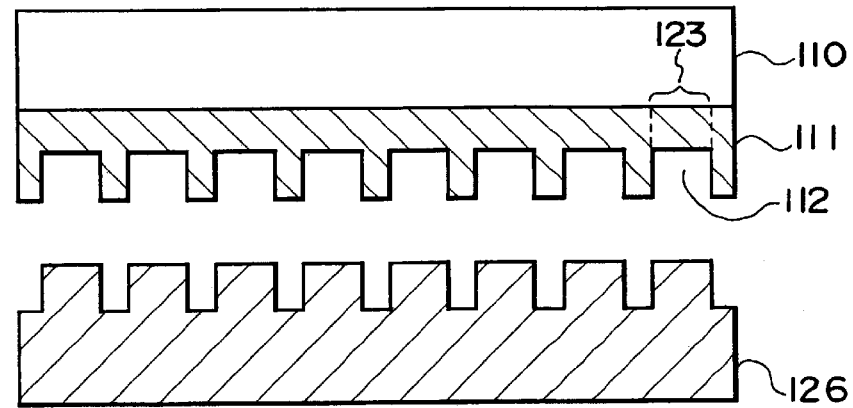

Next, FIGS. 15A to 15C illustrate the process of forming an ink filling layer having ink filling concavities in a sixth embodiment of the invention.

First, as shown in FIG. 15A, a second template 126 is provided with a relief pattern corresponding to the ink filling concavities 112 described above. The convex portions 127 formed on the second template 126 correspond to the ink filling concavities 112 formed in the ink filling layer 111 shown in FIG. 15C. The method of making the second template 126 will be described later. Next, as shown in FIG. 15B, the second template 126 is brought into contact with the template 110 with the material to form the ink filling layer 111 interposed.

The material for forming the ink filling layer 111 is not subject particularly to restriction as long as in regions 123 for forming the color pattern layer shown in FIG. 16C, that is to say, at the thickness of the bottom of the ink filling concavities 112, it has sufficient optical transmissivity not to impair the color characteristics of the color pattern layer 115, and various resins, glass materials, metal materials, or ceramic materials can be used, and it is preferably a material which can be set by applying energy. As specific examples of energy, any one of light, heat and both of them are preferable. In this case it is essential that there is a component which can be set by light, heat, or both light and heat, and a variety of commercially available resins, photosensitive materials, and hardeners may be used. In particular, a liquid substance such as acrylic resins of the type set by ultraviolet rays, or epoxy resins cured by heat may preferably be used. By thus using, as the material for forming the ink filling layer 111, a liquid material which can be set by applying energy, when this has been coated on the second template 126, and bringing into contact has been carried out, the material for forming the ink filling layer 111 can easily be formed into even the fine parts of the concavities 128 of the relief pattern formed on the second template 126. Thus by applying energy to the ink filling layer 111 to set it, the relief pattern on the second template 126 can be precisely transferred to the ink filling layer 111.

Besides, the template 110 is the same as in the description of FIG. 12A above, and description is omitted here.

Next, as shown in FIG. 14C, the ink filling layer 111 to which the relief pattern of the second template 126 has been transferred is separated from the second template 126 unitarily with the template 110, so that the ink filling layer ill having ink filling concavities 112 is formed on the template 110.

By this process, the second template 126, once made, can be used as many times as necessary, within the limits of durability, and is thus economical.

Next the concrete method of making the second template 126 is described. FIGS. 16A to 16E illustrate the method of making the second template 126 in this embodiment.

First, as shown in FIG. 16A, the resist layer 118 is formed on a substrate 129. As a method of forming the resist layer 118 may be used, for example, the spin-coating method, dipping method, spray-coating method, roll-coating method, or bar-coating method.

The substrate 129 has its surface etched to form the second template 126, and here a silicon wafer is used. The technology of etching a silicon wafer is established in the art of making semiconductor devices, and etching at high precision and with a high degree of control can be carried out. It should be noted that as long as the substrate 129 is a material which can be etched, it is not restricted to being a silicon wafer, and for example a plate or film of glass, quartz, resin, metal, ceramic, or other material may be used.

The material forming the resist layer 118 may be the same as in FIG. 11A in the fourth embodiment described above, and description is omitted here. In FIG. 16A, a positive resist is used.

Next, as shown in FIG. 16B, a mask 130 is disposed above the resist layer 118, and predetermined regions only of the resist layer 118 are exposed through the mask 130 to radiation 120. The mask 130 is patterned so as to transmit the radiation 120 only in those regions corresponding to the concavities 128 shown in FIG. 16E, and the pattern is the inverse of the pattern used in FIG. 118 described above.

Then when, after exposure to the radiation 120, developing is carried out, as shown in FIG. 16C, the resist in the radiation-exposed regions 121 only is selectively removed, exposing the substrate 129, while other regions remain covered by the resist layer 118.

When the resist layer 118 is patterned in this way, as shown in FIG. 16D, with the resist layer 118 as a mask, the substrate 129 is etched.

The method of etching may be wet etching or dry etching, but according to the material of the substrate 129, the method may be chosen to be optimum from a consideration of the etching cross-sectional shape, the etching rate, and so forth. For controllability dry etching is superior, and a device using, for example the parallel flat plate reactive ion etching (RIE) method, the inductive coupled plasma (ICP) method, the electron cyclotron resonance (ECR) method, helicon wave excitation method, magnetron method, plasma etching method, ion beam etching method or the like may be used, and by varying the etching gas species, the gas flow rate, the gas pressure, the bias voltage, and other conditions, the convex portions 127 corresponding to the ink filling concavities may be formed in an oblong shape, a taper may be applied, the surface may be made rough, and a desired etching shape may be obtained.

Next, after etching is completed, the resist layer 118 is removed, as shown in FIG. 16E, and the second template 126 having a relief pattern corresponding to the ink filling concavities is obtained.

In the above embodiment, a positive resist is used, but equally a negative resist, in which regions not exposed to radiation are rendered selectively able to be removed by the developer, may be used; in this case the mask used has a pattern which is the inversion of the pattern of the mask 130 described above. Alternatively, instead of using a mask, a laser beam or electron beam may be used to directly expose the resist.

Next, FIGS. 17A to 17E illustrate another method of making the second template in this embodiment.

Figure 17A:
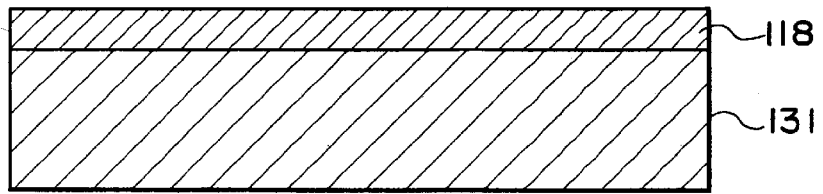
FIGS. 17A to 17E illustrate another method of making a second template in the sixth embodiment of the invention.

First, as shown in FIG. 17A, the resist layer 118 is formed on a third template 131. As a method of forming the resist layer 118 may be used, for example, the spin-coating method, dipping method, spray-coating method, roll-coating method, or bar-coating method.

The third template 131 fulfills the role of a support while the desired relief pattern 1a formed in the resist layer 118, and is not restricted as long as it has appropriate strength, chemical resistance, and other properties to withstand the flow of the process, and has satisfactory wettability and adhesion to the material of which the resist layer 118 is formed; for example a plate or film of a silicon wafer, glass, quartz, resin, metal, ceramic, or other material may be used.

The material used for forming the resist layer 118 may be the same as in the description of FIG. 16A above, and description is omitted here.

Figure 17B:

Next, as shown in FIG. 17B, the mask 119 is disposed on the resist layer 118, and predetermined regions only of the resist layer 118 are exposed through the mask lie to radiation 120. The mask 119 differs from the mask 130 of FIG. 16B only in that the pattern is inverted, and the same mask may be used as in FIG. 11B in the fourth embodiment described above.

Figure 17C:
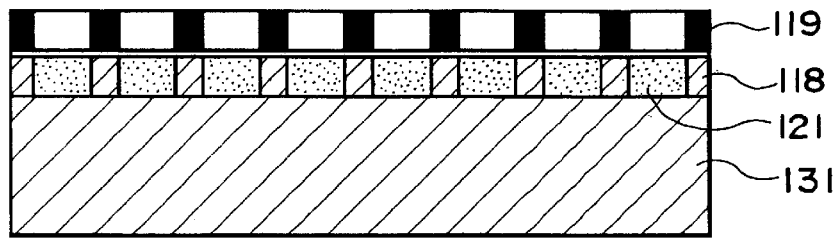
Figure 17D:
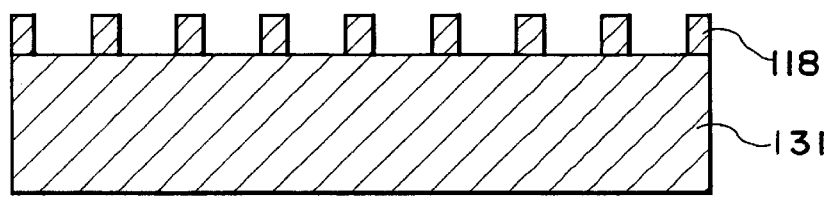
Figure 17E:
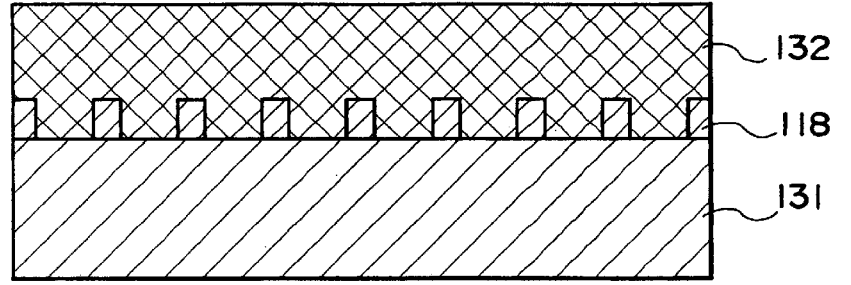

In other words, the mask 119 is such as to expose, to the radiation 120, the resist in areas corresponding to the convex portions 127 shown in FIG. 17E.

Then when, after exposure to the radiation 120, developing process is carried out under predetermined conditions, as shown in FIG. 17C, the resist in the radiation-exposed regions 121 corresponding to the convex portions 127 only is selectively removed, forming a relief pattern in the resist layer 118. This relief pattern is a concave mold of the convex portions 127 in FIG. 17E.

Next, as shown in FIG. 17D, a metal layer 132 is formed on the resist layer 118, making the surface conductive. As the metal layer 132 may be used, for example Ni formed up to a thickness of 500 to 1000 Angstroms. The method of forming the metal layer 132 may be a method such as sputtering, CVD, vapor deposition, or nonelectrolytic plating. Then with the resist layer 118 which has been made conductive by the metal layer 132 as the cathode, and a tip-shaped or ball-shaped Ni as the anode, electroplating is further carried out to electrically deposit Ni to make the metal layer 132 thicker. The following is an example electrolyte.

Nickel sulfamate: 55 9/l
Boric acid: 35 g/l
Nickel chloride: 5 g/l
Leveling agent: 20 mg/l Next, this metal layer 132 is separated from the third template, subjected to washing and so forth, and as shown in FIG. 17E, forms the second template 126. This second template 126 has convex portions 127 of the same shape as the second template 126 in FIG. 16E obtained in the embodiment described above.

In this embodiment Besides, a negative resist may be used, or the resist may be exposed to radiation directly, using a laser beam or electron beam.

It should be noted that in the process shown in FIG. 16C, depending on the materials, the adhesion force between the second template 126 and the ink filling layer 111 may increase, and it may be difficult to separate the ink filling layer 111 from the second template 126 and this may increase the number of produced items which are defective because of falling off of the ink filling layer ill or the creation of cracks, and lead to problems such as increased time taken for separation, reducing production efficiency, and further to a reduction of the durability of the second template 126.

Here, it is preferable that a release agent is coated on at least the regions of the surface of the second template 126 which the ink filling layer 111 contacts, or alternatively a release agent is added previously to the material used to form the ink filling layer 111, whereby the ink filling layer 111 is made easier to separate from the second template 126. As the method of applying the release agent, may be used, for example, the spin-coating method, dipping method, spray-coating method, roll-coating method, bar-coating method, or vapor treatment, and so forth.

Figure 18:
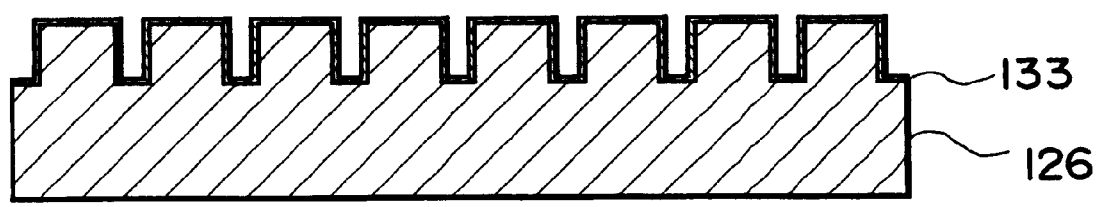
FIG. 18 is a sectional view of a second template on which has been formed a releasing layer in the sixth embodiment of the invention.

Besides, as shown in FIG. 18, in at least the regions of the surface of the second template 126 which the ink filling layer 111 contacts, may be formed a releasing layer 133 of a material improving the ease of separation of the ink filling layer 111, that is to say, a material of low adhesion to the ink filling layer 111. As the releasing layer 133, may be preferably used a metal being any one of Ni, Cr, Ti, Al, Cu, Ag, Au, or Pt, or an alloy of two or more of these, or a compound including at least one of these. These materials have generally low adhesion to acrylic resins which are preferably used in view of their excellent light transmissivity as the material for forming the ink filling layer 111, and may be formed as a film with highly controllability, using vacuum film formation method such as sputtering, vapor deposition, or CVD. It should be noted that the thickness of this releasing layer 133 may be of the order of tens to thousands of Angstroms.

In this way, when the second template 126 is obtained, by carrying out the process shown in FIGS. 15B and 15C, the ink filling layer 111 having ink filling concavities 112 is formed on the template 110.

(Seventh Embodiment)

Figure 19A:
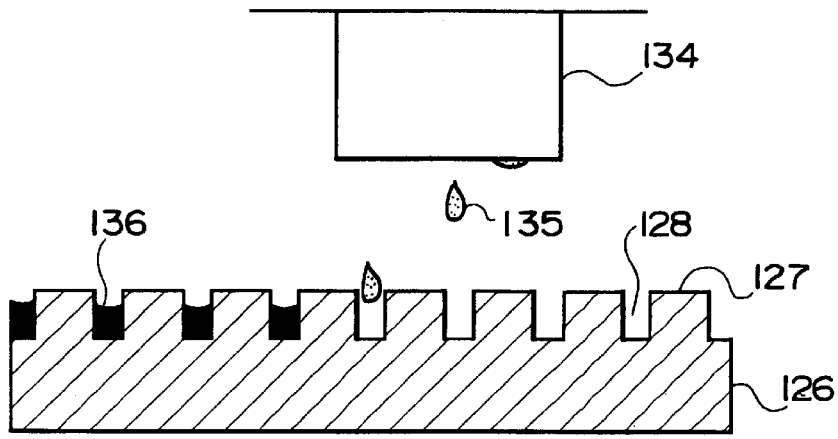
FIGS. 19A to 19C illustrate the process of formation of an ink filling layer having ink filling concavities, having an integral opaque layer, in a seventh embodiment of the invention.
Figure 19B:
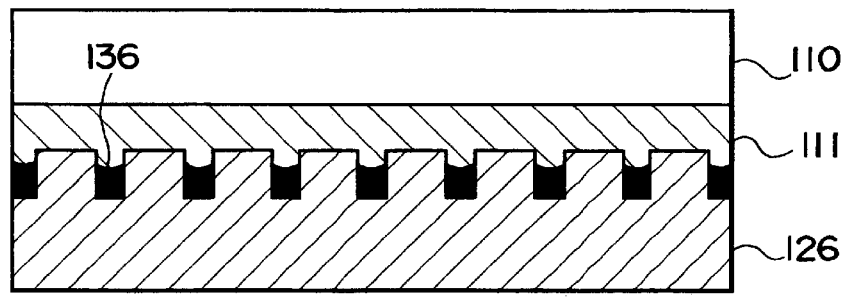
Figure 19C:
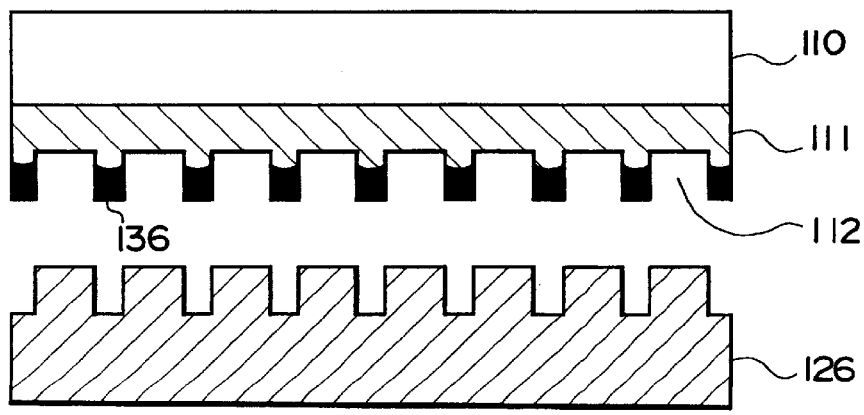

Next, FIGS. 19A to 19C illustrate the process of forming an ink filling layer having ink filling concavities, having an integral opaque layer, in a seventh embodiment of the invention.

First, in FIG. 19A, a head 134 ejecting ink by an inkjet method is disposed facing the surface of the second template 126 obtained by the above-described method in which the relief pattern is formed.

The head 134 may employ the head of the inkjet type used for filling the ink filling concavities with inks of colors of R, G and B in the process shown in FIG. 12A, with modification for single-color use, and description is omitted here.

Besides, the convex portions 127 on the second template 126 correspond to the ink filling concavities 112 shown in FIG. 19C, and the concavities 128 correspond to the regions between the color pattern layers 115 formed on the color filter shown in FIGS. 12A to 12C.

FIG. 19A shows an opaque ink 135 being ejected into the concavities 128 on the second template 126 by the head 134, forming an opaque layer 136.

The opaque ink 135 is not subject particularly to restriction, and specifically an ink including carbon, black pigment, black dye and so on may preferably be used.

Besides, the opaque ink 135 may include a material which is set by applying energy.

Such a component is not subject particularly to restriction as long as it does not impair the opaque characteristics of the ink, and does not cause problems such as solidification within the ink, and may for example be a is resin including a component which is set or cured by any one of light, heat, and light and heat. Specifically, various acrylic resins and epoxy resins, for which commercially available various light sensitive materials, hardeners and so forth can be used, may preferably be used.

It should be noted that in the process of forming the opaque layer 136, as in the embodiments described above, depending on the materials, the adhesion force between the second template 126 and the opaque layer 136 may increase, and when separating the opaque layer 136 and ink filling layer 111 after solidification as one from the second template 126, this may increase the number of produced items which are defective because of falling off of the opaque layer 136 and ink filling layer 111 or the creation of cracks thereof, and lead to problems such as increased time taken for separation, reducing production efficiency, and further to a reduction of the durability of the second template 126.

Here, it is preferable that a release agent is added to the opaque ink 135 whereby the opaque layer 136 is made easier to separate from the second template 126.

Thus all of the concavities 128 on the second template 126 are filled with the ink 135. If the ink 135 includes a solvent ingredient, heat treatment is carried out to volatilize the ink solvent. The conditions for this heat treatment may be determined considering the boiling point of the solvent ingredient included in the ink. The solvent ingredient used in the ink is not subject particularly to restriction, and may be water, or a variety of organic solvents, but volatilization of the solvent while the ink is used leads to solidification of the ink and the clogging of the ink nozzles or the ink pathways of the head 134. For this reason, the solvent used in the ink preferably has a high boiling point. On the other hand, however, in order not to obstruct the removal of the solvent, a high boiling point is undesirable. A preferable range for the boiling point of the solvent is 80 to 200° C. In this case the conditions for heat treatment, at 50 to 200° C., are from 2 to 10 minutes when using a hotplate or from 20 to 30 minutes when using a baking oven.

Besides, the opaque layer 136 shrinks when the solvent is removed, and it is necessary to supply an ink amount sufficient to ensure the required opaqueness for the thickness after shrinking.

Next, as shown in FIG. 19B, the ink filling layer 111 is formed on the opaque layer 136, and the template 110 is placed thereon.

As the material for forming the ink filling layer 111, may be used the same as described above, and in particular a material is preferable which has good adhesion to the opaque layer 136.

Besides, if the material forming the ink filling layer 111 is a liquid material which can be set by applying energy, energy is applied to carry out setting treatment, thus causing solidification, and forming the ink filling layer 111.

In particular, if both of the opaque layer 136 and ink filling layer 111 are selected to be able to be set by the same energy, the ink filling layer 111 may be formed before the opaque layer 136 is set, and by applying energy simultaneously to both, both may be set simultaneously, thus allowing unitary hardening.

Besides, the template 110 is the same as in the description of FIG. 12A above, and description is omitted here.

Then, as shown in FIG. 19C, by separation unitarily with the template 110 from the second template 126, the ink filling layer 111 having ink filling concavities 112 with the integrally formed opaque layer 136 is formed on the template 110.

Figure 20:
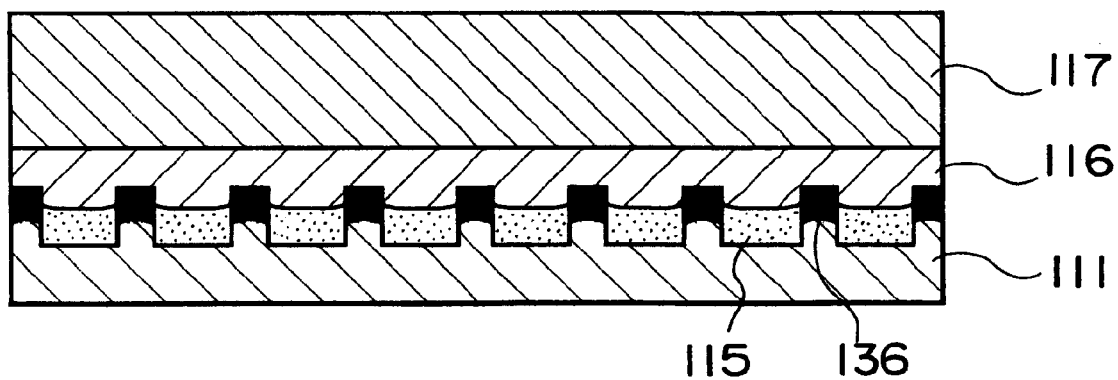
FIG. 20 shows a color filter having integrally the BM of the seventh embodiment of the invention.

Further, subsequently carrying out the process shown in FIGS. 12A to 12C, the color filter with integral BM shown in FIG. 20 is obtained.

According to the method of making a color filter described above, a high-precision color filter can be obtained at a low cost, which has excellent flatness, and no unevenness of color. It is also possible to provide an internal BM economically and with high precision.

Further, if required, transparent electrodes and an alignment layer may be applied to the ink filling layer 111, then array mounting carried out.

(Eighth Embodiment)

Next, FIGS. 21A to 22C illustrate the process of making a color filter in an eighth embodiment of the invention.

Figure 21A:
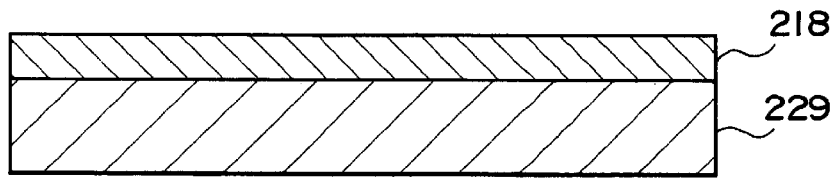
FIGS. 21A to 21E illustrate the process of making a template in an eighth embodiment of the invention.
Figure 21B:
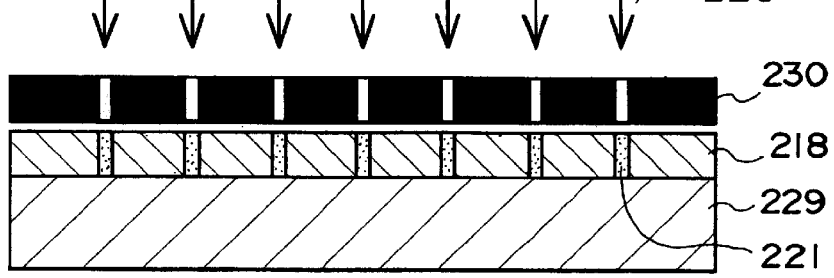
Figure 21C:
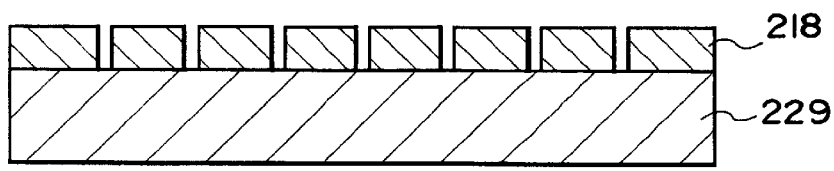

First, as shown in FIG. 21A, a resist layer 218 is formed on a substrate 229. The substrate 229 has its surface etched to form the template 210. Next, as shown in FIG. 21B, a mask 230 is placed on the resist layer 218, and predetermined regions only of the resist layer 218 are exposed through the mask 230 to radiation 220, and thereafter development is carried out, whereupon as shown in FIG. 21C, the resist in the radiation-exposed regions 221 only is selectively removed, exposing the substrate 229, while other regions remain covered by the resist layer 218.

Figure 21D:
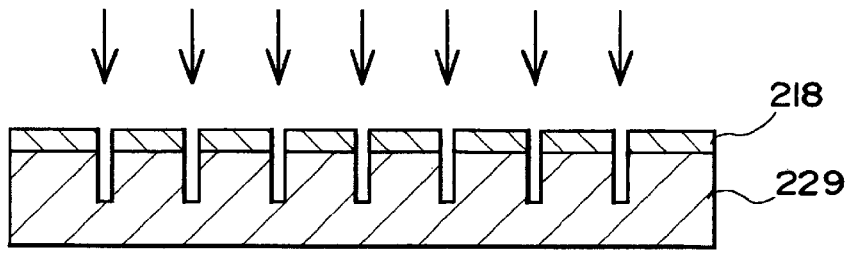
Figure 21E:
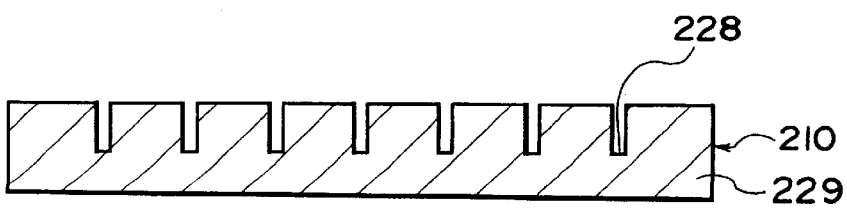

When the resist layer 218 is patterned in this way, as shown in FIG. 21D, the substrate 229 is etched using the resist layer 218 as a mask. When the etching is completed, the resist layer 218 is removed, and as shown in FIG. 21E, a template 210 having spacer-forming concavities 228 is obtained.

Figure 22A:
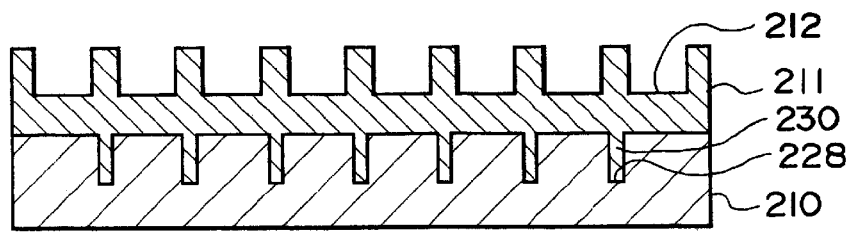
FIGS. 22A to 22C illustrate the process after formation of an ink filling layer having ink filling concavities on the template in the eighth embodiment of the invention.
Figure 22B:
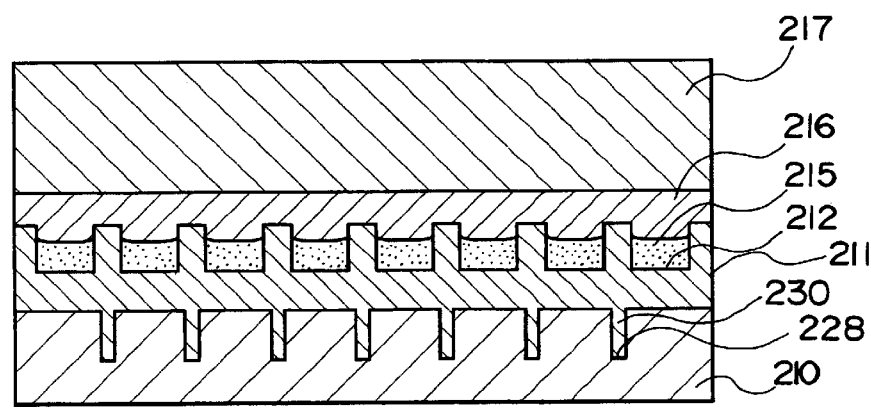

Next, as shown in FIG. 22A, an ink filling layer 211 is formed. In detail, a liquid resin is disposed on the template 2103 and this resin is solidified for form the ink filling layer 211. Here, since the resin also flows into the spacer-forming concavities 228 of the template 210, corresponding to the spacer-forming concavities 228, spacers 230 are formed projecting from the ink filling layer 211. Besides, on the ink filling layer 211, ink filling concavities 212 are formed by, for example, the methods described in the fourth to sixth embodiments above.

Figure 22C:
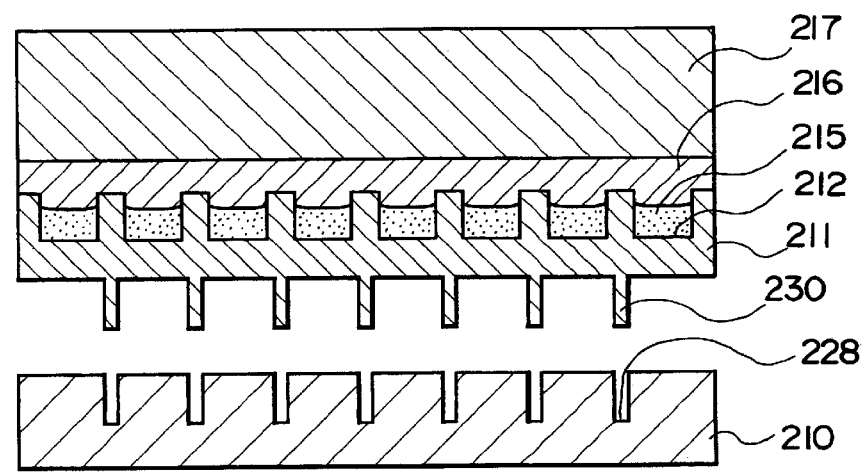

Thereafter, by the same process as shown in FIGS. 12A and 12B, all of the ink filling concavities 212 are filled with ink 214 to form a color pattern layers 215, on the ink filling layer 211 a resin layer 216 is formed, and further a glass substrate 217 is placed thereon. In this way, the color filter of FIG. 22C is obtained.

According to this embodiment, on the opposite side from the ink filling concavities 212 in the ink filling layer 211, spacers 230 are provided. As a result, a color filter can be made with integral spacers. The spacers 230 can be formed in a desired form corresponding to the form of the spacer-forming concavities 228, and for example, in a striped pattern or in an island pattern as square or cylindrical pillars. Whatever the shape, it is preferable for the width or diameter to be from 10 to 20 $\mu$m. In the case of a striped pattern, the strength is higher than for an island pattern, but when the liquid crystal panel is assembled, the striped pattern may be more conspicuous. In the case of an island pattern, cylindrical pillars, with no corners, are more effective for reducing irregularities in the alignment of the liquid crystal in the vicinity of the spacer construction.

Besides, it is preferable for the spacers 230, in order not to be conspicuous when the liquid crystal panel is assembled, to be provided between the color patterns 215 forming the pixels.

(Ninth Embodiment)

Figure 23A:
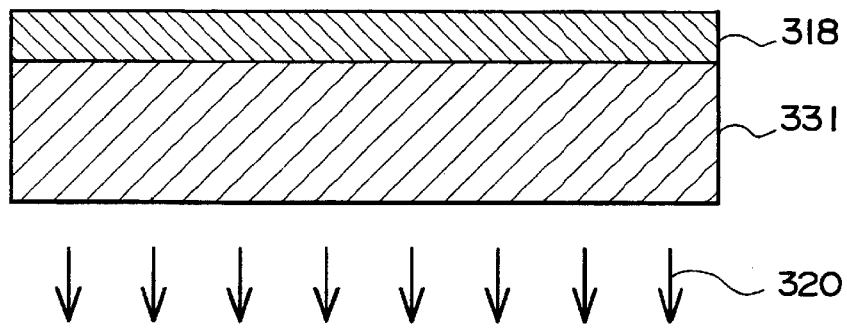
FIGS. 23A to 23E illustrate the process of making a template in a ninth embodiment of the invention.
Figure 23B:
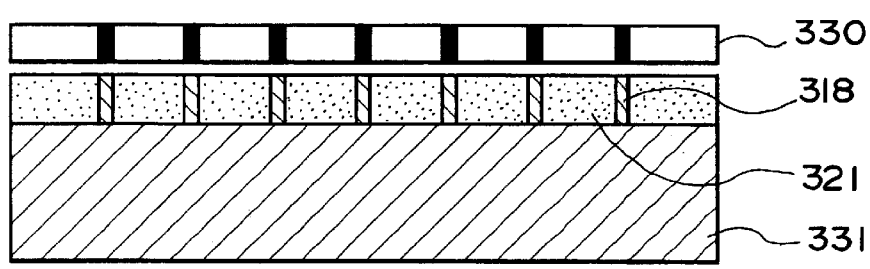
Figure 23C:
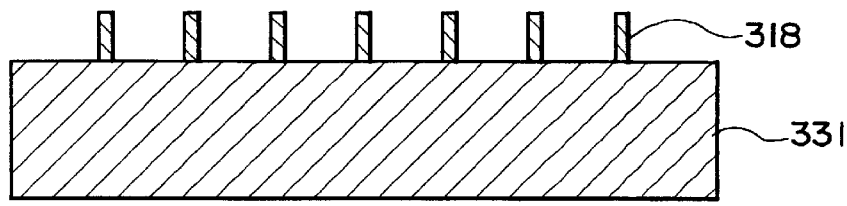

Next, FIGS. 23A to 23C illustrate the process of making a color filter in a ninth embodiment of the invention, and show a process of making a template which can be applied in place of FIGS. 21A to 21E.

First, as shown in FIG. 23A, a resist layer 318 is formed on a fourth template 331. Next, as shown in FIG. 23B, a mask 330 is placed on the resist layer 318, and predetermined regions only of the resist layer 318 are exposed through the mask 330 to radiation 320.

After exposure to the radiation 320, developing process is carried out under predetermined conditions, and as shown in FIG. 23C, the resist in radiation-exposed regions 321 only is selectively removed, leaving convex portions in the resist layer 318. The convexities formed in the resist layer 318 are convexities for the purpose of forming spacer-forming concavities 328 in FIG. 23E.

Figure 23D:
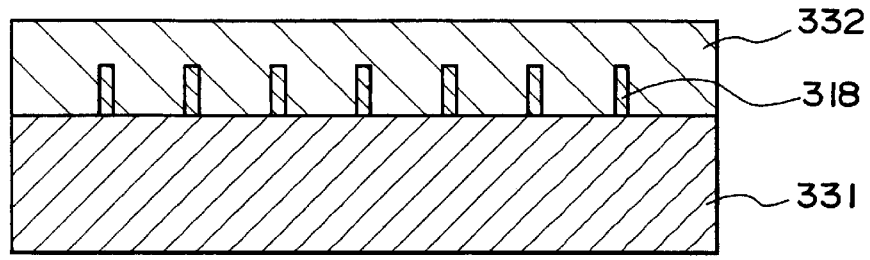

Next, as shown in FIG. 23D, a metal layer 332 is formed on the resist layer 318 having the convex portions.

Figure 23E:
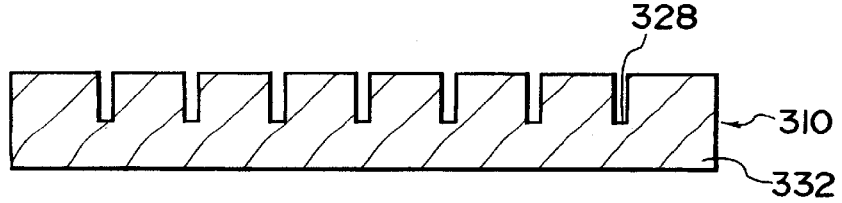

Next, this metal layer 332 is separated from the fourth template 331, the resist layer 318 is removed, and as shown in FIG. 23E, a template 310 is obtained. This template 310, similar to the template 210 shown in FIG. 21E, has spacer-forming concavities 328.

(Tenth Embodiment)

Figure 24A:
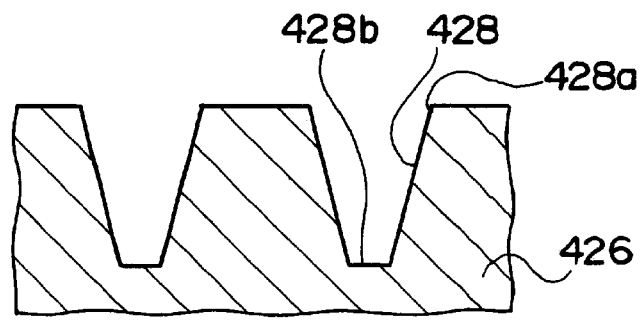
FIGS. 24A to 24C illustrate the process of making a BM in a tenth embodiment of the invention.
Figure 24B:
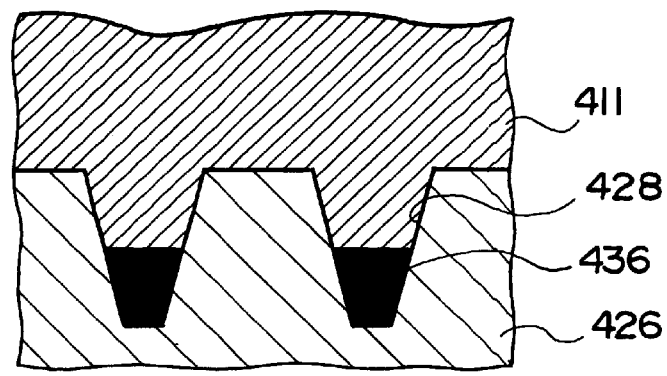
Figure 24C:
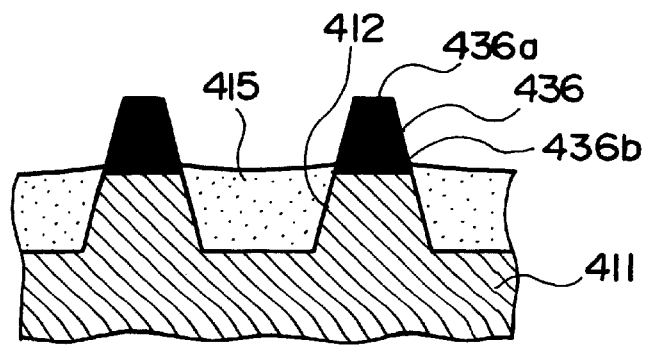

Next, FIGS. 24A to 24C illustrate the process of making a color filter in a tenth embodiment of the invention. This embodiment has a variant form of the concavities 128 of the second template 126 in FIG. 19A.

Specifically, as shown in FIG. 24A, concavities 428 formed in a second template 426 are given a taper, so that the bottom area 428$b$ is smaller than the opening portion 428$a$. Using this second template 426, as shown in FIG. 24B, the concavities 428 are filled with an opaque ink to form an opaque layer 436, and an ink filling layer 411 is formed thereon.

Thereafter, as shown in FIG. 24C, ink filling concavities 412 of the ink filling layer 411 are filled with ink, to form a color pattern layer 415.

With the color filter obtained in this way, as shown in FIG. 24C, the top surface 436$a$ of the opaque layer 436 is smaller than the cross-sectional area of the base portion 436$b$. That is to say, by means of this opaque layer 436, a narrow BM is formed. Such a narrow BM meets current needs for a high aperture ratio in the color filter. Moreover, in this embodiment, as shown in FIG. 24A, since the opening portions 428$a$ of the concavities 428 are larger than the bottom areas 428, the separation of the ink filling layer 411 and opaque layer 412 can be carried out easily.

Figure 25A:
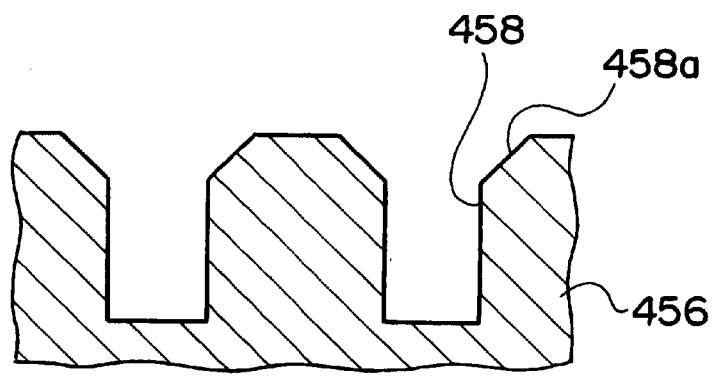
FIGS. 25A and 25B illustrate a variant of the tenth embodiment of the invention.
Figure 25B:
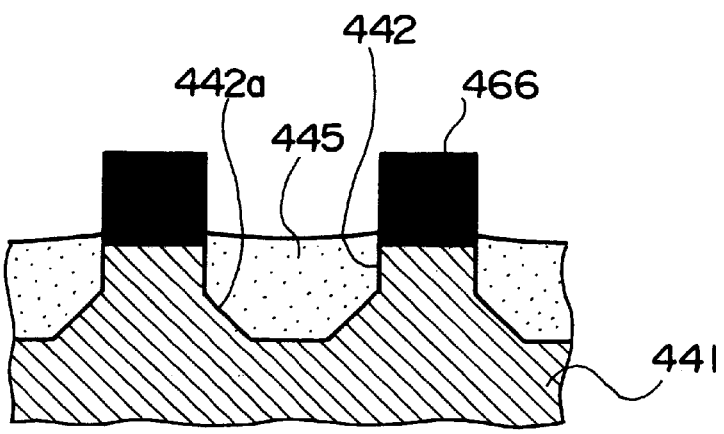

It should be noted that the above described concavities 428 may also be varied as shown in FIGS. 25A and 25B. That is to say, as shown in FIG. 25A, concavities 458 of a second template 456 may have a taper 458$a$ provided at the opening portion. With such concavities 458, as shown in FIG. 25B, ink filling concavities 442 of an ink filling layer 441 are formed with a taper 442$a$ at their bottoms, but an opaque layer 466 is formed vertically. According to this embodiment, the opaque layer 466 may be formed in the same way as the opaque layer 136 shown in FIG. 19C.

What is claimed is:

1. A method of making a color filter comprising:
   a step of causing a discharge in an atmosphere of gas including at least oxygen at atmospheric pressure or a pressure close thereto, and treating a substrate with activated species created by the discharge; and
   a stop of forming color pattern layers by injecting ink of at least one predetermined color in a plurality of ink filling concavities formed in a predetermined layout on a template, then adhering the substrate to the template having the color pattern layers formed thereon with a resin layer interposed therebetween, and then separating the color pattern layers, the resin layer, and the substrate as one from the template.

2. The method of making a color filter of claim 1, wherein the ink is injected using an inkjet method.

3. The method of making a color filter of claim 1, wherein in the step of treating the substrate, a discharge generating electrode is disposed in close vicinity to the substrate, a high frequency voltage is applied to the discharge generating electrode, the discharge is created in a space between the substrate and the discharge generating electrode, and the gas including at least the oxygen passes through the space creating the activated species, and whereby the substrate is treated.

4. The method of making a color filter of claim 3, wherein the discharge generating electrode has an area equal to or bigger than a treatment area of the substrate.

5. The method of making a color filter of claim 1, wherein in the step of treating the substrate, a discharge generating electrode and a counterelectrode are disposed, a high frequency voltage is applied between the discharge generating electrode and the counterelectrode, the discharge is created in a space between the discharge generating electrode and the counterelectrode, the gas including at least the oxygen passes through the space creating the activated species, the substrate is disposed to avoid the discharge, and a gas flow including the activated species is expelled from a gas outlet, whereby the substrate is treated.

6. The method of making a color filter of claim 5, wherein the gas outlet has an area equal to or bigger than a treatment area of the substrate.

7. The method of making a color filter of claim 1, wherein the substrate is treated while heated.

8. The method of making a color filter of claim 1, wherein the substrate is treated while cooled.

9. A method of making a color filter comprising:
   a first step of forming a first template having an ink filling layer with a plurality of ink filling concavities formed in a predetermined layout, wherein a substance of liquid for forming the ink filling layer which can be set by applying energy is provided on a second template having a relief pattern consisting of convex portions corresponding to the ink filling concavities and concave portions formed around the convex portions, the first template is put into the substance, the substance after set is separated together with the first template as one from the second template, and the relief pattern of the second template is transferred to the substance, whereby the ink filling layer having the ink filling concavities is formed on the first template;
   a second step of forming color pattern layers by injecting ink of at least one predetermined color in each of the ink filling concavities;
   a third step of forming a resin layer having optical transmissivity by painting resin over the ink filling layer where the color pattern layers are formed; and
   a fourth step of separating the resin layer together with the color pattern layers and the ink filling layer as one from the first template, after the resin layer is set.

10. The method of making a color filter of claim 9, wherein in the second step, the ink is injected using an inkjet method.

11. The method of making a color filter of claim 9, wherein the second step includes a step of heat-treating the ink injected in the ink filling concavities, volatilizing a solvent ingredient therein.

12. The method of making a color filter of claim 9, wherein in the first step, the ink filling layer is formed after applying a release agent in at least a region of a surface of the first template on which the ink filling layer is formed.

13. The method of making a color filter of claim 9, wherein a release agent is added to the ink filling layer.

14. The method of making a color filter of claim 9, wherein a releasing layer of low adhesion to the ink filling layer is formed in at least a region of a surface of the first template on which the ink filling layer is formed.

15. The method of making a color filter of claim 9, wherein the third stop includes a step of mounting on the resin layer a reinforcing plate having optical transmissivity.

16. The method of making a color filter of claim 9, wherein in the first step, the ink filling concavities are formed in the ink filling layer by etching.

17. The method of making a color filter of claim 9, wherein the relief pattern of the second template is formed by etching.

18. The method of making a color filter of claim 17, wherein the second template is formed from a silicon wafer.

19. The method of making a color filter of claim 9, wherein the second template is formed by;
   etching a resist layer formed on a third template to form a resist pattern in the resist layer corresponding to the relief pattern of the second template;
   making a surface of the resist pattern electrically conductive and electrodepositing metal by an electroplating method to form a metal layer; and
   removing the metal layer from the third template and removing the resist.

20. The method of making a color filter of claim 9, wherein the substance of liquid is provided on the second template, after a release agent is applied in at least a region of a surface of the second template which the ink filling layer touches.

21. The method of making a color filter of claim 9, wherein the second template has a releasing layer of low adhesion to the substance of liquid in at least a region on its surface which ink filling layer touches.

22. The method of making a color filter of claim 9, wherein in the first step, the substance of liquid is provided on the second template, after an opaque ink is injected in the concave portions of the second template; and an opaque layer is formed from the opaque ink around the ink filling concavities.

23. The method of making a color filter of claim 22, wherein the opaque ink is injected using an inkjet method.

24. The method of making a color filter of claim 22, further comprising a step of heat-treating the opaque ink injected in the concave portions of the second template, volatilizing a solvent ingredient therein.

25. The method of making a color filter of claim 22, wherein a release agent is added to the opaque ink.

26. The method of making a color filter of claim 22, wherein each of the concave portions of the relief pattern of the second template is smaller at its bottom area than at its opening portion.

27. The method of making a color filter of claim 9, wherein:
   a concave portion for forming a spacer is formed in the first template;
   in the first step, the ink filling layer is formed by providing on the first template a substance of liquid for forming the ink filling layer and setting the substance; and
   a convex portion for the spacer is formed in the ink filling layer corresponding to the concave portion for forming the spacer.

28. A color filter comprising:
   an ink filling layer of optical transmissivity having ink filling concavities;
   a color pattern layer formed by injecting ink of at least one predetermined color in each of the ink filling concavities;
   an opaque layer formed around each of the ink filling concavities;
   a resin layer of optical transmissivity applied over the ink filling layer where the color pattern layer is formed, wherein each of the ink filling concavities is formed so as to widen from its bottom area toward its opening portion; and the opaque layer, around the opening, is formed with its top portion smaller than its base portion.

29. The color filter of claim 28, further comprising a reinforcing plate having optical transmissivity on the resin layer.

30. The color filter of claim 28, wherein the ink filling layer has an integrally formed spacer.

31. A method of making a color filter comprising:

forming an ink filling layer having a plurality of ink filling concavities on a template;

forming color pattern layers by injecting ink of predetermined color in each of the ink filling concavities;

forming a resin layer having optical transmissivity between a substrate and the ink filling layer having the color pattern layers formed thereon, the substrate having a surface treated with activated species created by a discharge in an atmosphere of gas including oxygen, the surface treated with the activated species being adhered to the resin layer; and separating the substrate, the resin layer, the color pattern layers and the ink filling layer from the template, after the resin layer is set.

32. The method of making a color filter of claim 31, wherein the ink is injected using an inkjet method.

33. The method of making a color filter of claim 31, wherein the step of forming the color pattern layers includes a step of heat-treating the ink injected in the ink filling concavities, volatilizing a solvent ingredient therein.

34. The method of making a color filter of claim 31, wherein the ink filling layer is formed after applying a release agent in a region of a surface of the template on which the ink filling layer is formed.

35. The method of making a color filter of claim 31, wherein a release agent is added to the ink filling layer.

36. The method of making a color filter of claim 31, wherein a releasing layer of low adhesion to the ink filling layer is formed in a region of a surface of the template on which the ink filling layer is formed.

37. The method of making a color filter of claim 31, wherein the resin layer is formed by adhering the substrate to the ink filling layer with a resin to form the resin layer interposed therebetween.

38. The method of making a color filter of claim 31, wherein the ink filling concavities are formed in the ink filling layer by etching.

* * * * *